US006545718B1

(12) United States Patent
Nakanishi et al.

(10) Patent No.: US 6,545,718 B1
(45) Date of Patent: Apr. 8, 2003

(54) CATHODE RAY TUBE AND APPARATUS AND METHOD OF CONTROLLING BRIGHTNESS

(75) Inventors: Satoru Nakanishi, Kanagawa (JP); Yasunobu Kato, Kanagawa (JP); Masamichi Okada, Kanagawa (JP)

(73) Assignee: Sony Corporation, Tokyo (JP)

( * ) Notice: Subject to any disclaimer, the term of this patent is extended or adjusted under 35 U.S.C. 154(b) by 392 days.

(21) Appl. No.: 09/587,471

(22) Filed: Jun. 5, 2000

(30) Foreign Application Priority Data

Jun. 7, 1999 (JP) ........................................ 11-159668
Mar. 29, 2000 (JP) .................................... 2000-091170

(51) Int. Cl.[7] ............................ H04N 5/66; H04N 9/12
(52) U.S. Cl. ........................ 348/383; 348/778; 348/687
(58) Field of Search ................................ 348/778, 383, 348/739, 745, 805, 806, 807, 673, 687; 315/367, 370, 371, 383; H04N 5/66, 9/12, 5/57

(56) References Cited

U.S. PATENT DOCUMENTS

| | | | | |
|---|---|---|---|---|
| 4,792,720 A | | 12/1988 | Takenaka et al. | |
| 5,136,390 A | | 8/1992 | Inova et al. | |
| 5,418,426 A | | 5/1995 | Rilly | |
| 5,771,072 A | * | 6/1998 | Tokoro et al. | 348/383 |
| 6,340,976 B1 | * | 1/2002 | Oguchi et al. | 345/690 |
| 6,452,636 B1 | * | 9/2002 | Saito et al. | 348/383 |
| 6,456,339 B1 | * | 9/2002 | Surati et al. | 348/745 |

FOREIGN PATENT DOCUMENTS

| | | |
|---|---|---|
| EP | 05300452 | 11/1993 |
| EP | 0 725 421 | 8/1996 |
| JP | 39-25641 | 9/1939 |
| JP | 42-4928 | 2/1942 |
| JP | 50-17167 | 2/1975 |
| WO | WO 99/34394 | 7/1999 |

* cited by examiner

*Primary Examiner*—John Miller
*Assistant Examiner*—Trang U. Tran
(74) *Attorney, Agent, or Firm*—Frommer Lawrence & Haug LLP; William S. Frommer

(57) ABSTRACT

A control portion detects a level of video signals for each color when video signals are inputted from a frame memory to DSP circuits. Next, the control portion calculates an appropriate correction coefficient of each color to be used in modulation control of brightness, for every unit pixel or unit pixel array among a plurality of correction coefficients stored in its own memory in advance based on the detected signal level. The control portion instructs the DSP circuits to perform modulation of brightness by using the determined correction coefficient.

13 Claims, 21 Drawing Sheets

X
Y
(i,j+1)
(i+1,j+1)
(i,j)
(i+1,j)
(Fr(i,j),Gr(i,j))
(Fg(i,j),Gg(i,j))
(Fb(i,j),Gb(i,j))
R
G
B

| Coefficient No. = | 1, | 2, | 3, | 4, | 5, | 6, | 7 |
|---|---|---|---|---|---|---|---|
| cram WRx 0 = | 256, | 256, | 256, | 256, | 256, | 256, | 256 |
| cram WGx 0 = | 256, | 256, | 256, | 256, | 256, | 256, | 256 |
| cram WBx 0 = | 256, | 256, | 256, | 256, | 256, | 256, | 256 |
| cram WRx 1 = | 256, | 256, | 256, | 256, | 256, | 256, | 256 |
| cram WGx 1 = | 256, | 256, | 256, | 256, | 256, | 256, | 256 |
| cram WBx 1 = | 256, | 256, | 256, | 256, | 256, | 256, | 256 |
| cram WRx 2 = | 256, | 256, | 256, | 256, | 256, | 256, | 255 |
| cram WGx 2 = | 256, | 256, | 256, | 256, | 256, | 256, | 255 |
| cram WBx 2 = | 256, | 256, | 256, | 256, | 256, | 256, | 255 |
| cram WRx 3 = | 256, | 256, | 256, | 256, | 256, | 256, | 254 |
| cram WGx 3 = | 256, | 256, | 256, | 256, | 256, | 256, | 254 |
| cram WBx 3 = | 256, | 256, | 256, | 256, | 256, | 256, | 255 |
| cram WRx 4 = | 256, | 256, | 256, | 256, | 256, | 256, | 253 |
| cram WGx 4 = | 256, | 256, | 256, | 256, | 256, | 256, | 253 |
| cram WBx 4 = | 256, | 256, | 256, | 256, | 256, | 256, | 253 |
| ⋮ | | | | ⋮ | | | |
| cram WRx 45 = | 45, | 35, | 34, | 25, | 19, | 19, | 0 |
| cram WGx 45 = | 36, | 33, | 32, | 19, | 18, | 17, | 0 |
| cram WBx 45 = | 30, | 33, | 31, | 18, | 17, | 17, | 1 |
| cram WRx 46 = | 35, | 25, | 25, | 17, | 9, | 10, | 0 |
| cram WGx 46 = | 26, | 24, | 23, | 10, | 9, | 9, | 0 |
| cram WBx 46 = | 20, | 23, | 22, | 9, | 8, | 8, | 0 |
| cram WRx 47 = | 25, | 15, | 15, | 8, | 0, | 0, | 0 |
| cram WGx 47 = | 15, | 14, | 14, | 0, | 0, | 0, | 0 |
| cram WBx 47 = | 10, | 14, | 13, | 0, | 0, | 0, | 0 |

FIG.11

```
Coefficient No. = {   1,   2,   3,   4,   5,   6,   7 }

 cram  WRx   0 = {  25,  15,  15,   8,   0,   0,   0 }
 cram  WGx   0 = {  15,  14,  14,   0,   0,   0,   0 }
 cram  WBx   0 = {  10,  14,  13,   0,   0,   0,   0 }

 cram  WRx   1 = {  35,  25,  25,  17,   9,  10,   0 }
 cram  WGx   1 = {  26,  24,  23,  10,   9,   9,   0 }
 cram  WBx   1 = {  20,  23,  22,   9,   8,   8,   0 }

 cram  WRx   2 = {  45,  35,  34,  25,  19,  19,   5 }
 cram  WGx   2 = {  36,  33,  32,  19,  18,  17,   8 }
 cram  WBx   2 = {  30,  33,  31,  18,  17,  17,   8 }

 cram  WRx   3 = {  54,  44,  44,  34,  28,  28,  14 }
 cram  WGx   3 = {  46,  43,  41,  28,  27,  26,  17 }
 cram  WBx   3 = {  39,  41,  40,  26,  25,  25,  17 }

 cram  WRx   4 = {  64,  53,  53,  43,  37,  37,  22 }
 cram  WGx   4 = {  56,  52,  50,  38,  35,  34,  26 }
 cram  WBx   4 = {  49,  50,  48,  35,  33,  33,  27 }
           :                         :
           :                         :
 cram  WRx  45 = { 256, 256, 256, 256, 256, 256, 255 }
 cram  WGx  45 = { 256, 256, 256, 256, 256, 256, 255 }
 cram  WBx  45 = { 256, 256, 256, 256, 256, 256, 255 }

 cram  WRx  46 = { 256, 256, 256, 256, 256, 256, 256 }
 cram  WGx  46 = { 256, 256, 256, 256, 256, 256, 256 }
 cram  WBx  46 = { 256, 256, 256, 256, 256, 256, 256 }

 cram  WRx  47 = { 256, 256, 256, 256, 256, 256, 256 }
 cram  WGx  47 = { 256, 256, 256, 256, 256, 256, 256 }
 cram  WBx  47 = { 256, 256, 256, 256, 256, 256, 256 }
```

FIG.12

```
var  Z1 = 40
var  Z2 = 80
var  Z3 = 120
var  Z4 = 160
var  Z5 = 200
var  Z6 = 240
```

FIG.13

| Coefficient No. | Signal level |
|---|---|
| 1 | 0～Z1 |
| 2 | Z1～Z2 |
| 3 | Z2～Z3 |
| 4 | Z3～Z4 |
| 5 | Z4～Z5 |
| 6 | Z5～Z6 |
| 7 | Z6～255 |

FIG.14

| Coefficient No. = | 1 | 2 | 3 | 4 | 5 | 6 | 7 | 8 |
|---|---|---|---|---|---|---|---|---|
| cram WRx 0 = | 256 | 256 | 256 | 256 | 256 | 256 | 256 | 256 |
| cram WGx 0 = | 256 | 256 | 256 | 256 | 256 | 256 | 256 | 256 |
| cram WBx 0 = | 256 | 256 | 256 | 256 | 256 | 256 | 256 | 256 |
| cram WRx 1 = | 256 | 256 | 256 | 256 | 256 | 256 | 255 | 256 |
| cram WGx 1 = | 256 | 256 | 256 | 256 | 256 | 256 | 255 | 256 |
| cram WBx 1 = | 256 | 256 | 256 | 256 | 256 | 256 | 255 | 256 |
| cram WRx 2 = | 256 | 256 | 256 | 256 | 256 | 256 | 255 | 256 |
| cram WGx 2 = | 256 | 256 | 256 | 256 | 256 | 256 | 255 | 256 |
| cram WBx 2 = | 256 | 256 | 256 | 256 | 256 | 256 | 255 | 256 |
| cram WRx 3 = | 256 | 256 | 256 | 256 | 256 | 256 | 254 | 256 |
| cram WGx 3 = | 256 | 256 | 256 | 256 | 256 | 256 | 254 | 256 |
| cram WBx 3 = | 256 | 256 | 256 | 256 | 256 | 256 | 254 | 256 |
| cram WRx 4 = | 256 | 256 | 256 | 256 | 256 | 256 | 253 | 256 |
| cram WGx 4 = | 256 | 256 | 256 | 256 | 256 | 256 | 253 | 256 |
| cram WBx 4 = | 256 | 256 | 256 | 256 | 256 | 256 | 253 | 256 |
| ⋮ | | | | ⋮ | | | | |
| cram WRx 44 = | 54 | 44 | 44 | 34 | 28 | 28 | 30 | 28 |
| cram WGx 44 = | 46 | 43 | 41 | 28 | 27 | 26 | 42 | 27 |
| cram WBx 44 = | 39 | 41 | 40 | 26 | 25 | 25 | 35 | 25 |
| cram WRx 45 = | 45 | 35 | 34 | 25 | 19 | 19 | 23 | 19 |
| cram WGx 45 = | 36 | 33 | 32 | 19 | 18 | 17 | 33 | 18 |
| cram WBx 45 = | 30 | 33 | 31 | 18 | 17 | 17 | 27 | 17 |
| cram WRx 46 = | 35 | 25 | 25 | 17 | 9 | 10 | 15 | 9 |
| cram WGx 46 = | 26 | 24 | 23 | 10 | 9 | 9 | 23 | 9 |
| cram WBx 46 = | 20 | 23 | 22 | 9 | 8 | 8 | 18 | 8 |
| cram WRx 47 = | 25 | 15 | 15 | 8 | 0 | 0 | 7 | 0 |
| cram WGx 47 = | 15 | 14 | 14 | 0 | 0 | 0 | 13 | 0 |
| cram WBx 47 = | 10 | 14 | 13 | 0 | 0 | 0 | 9 | 0 |

FIG.19

| | | | | | | | | | |
|---|---|---|---|---|---|---|---|---|---|
| Coefficient | No. = | { 1, | 2, | 3, | 4, | 5, | 6, | 7, | 8 } |
| cram | WRx 0 = | { 25, | 15, | 15, | 8, | 0, | 0, | 8, | 0 } |
| cram | WGx 0 = | { 15, | 14, | 14, | 0, | 0, | 0, | 10, | 0 } |
| cram | WBx 0 = | { 10, | 14, | 13, | 0, | 0, | 0, | 9, | 0 } |
| cram | WRx 1 = | { 35, | 25, | 25, | 17, | 9, | 10, | 16, | 9 } |
| cram | WGx 1 = | { 26, | 24, | 23, | 10, | 9, | 9, | 20, | 9 } |
| cram | WBx 1 = | { 20, | 23, | 22, | 9, | 8, | 8, | 17, | 8 } |
| cram | WRx 2 = | { 45, | 35, | 34, | 25, | 19, | 19, | 23, | 19 } |
| cram | WGx 2 = | { 36, | 33, | 32, | 19, | 18, | 17, | 29, | 18 } |
| cram | WBx 2 = | { 30, | 33, | 31, | 18, | 17, | 17, | 25, | 17 } |
| cram | WRx 3 = | { 54, | 44, | 44, | 34, | 28, | 28, | 31, | 28 } |
| cram | WGx 3 = | { 46, | 43, | 41, | 28, | 27, | 26, | 38, | 27 } |
| cram | WBx 3 = | { 39, | 41, | 40, | 26, | 25, | 25, | 34, | 25 } |
| cram | WRx 4 = | { 64, | 53, | 53, | 43, | 37, | 37, | 39, | 37 } |
| cram | WGx 4 = | { 56, | 52, | 50, | 38, | 35, | 34, | 46, | 35 } |
| cram | WBx 4 = | { 49, | 50, | 48, | 35, | 33, | 33, | 42, | 33 } |
| ⋮ | | | | ⋮ | | | | | |
| cram | WRx 44 = | { 256, | 256, | 256, | 256, | 256, | 256, | 254, | 256 } |
| cram | WGx 44 = | { 256, | 256, | 256, | 256, | 256, | 256, | 254, | 256 } |
| cram | WBx 44 = | { 256, | 256, | 256, | 256, | 256, | 256, | 254, | 256 } |
| cram | WRx 45 = | { 256, | 256, | 256, | 256, | 256, | 256, | 255, | 256 } |
| cram | WGx 45 = | { 256, | 256, | 256, | 256, | 256, | 256, | 255, | 256 } |
| cram | WBx 45 = | { 256, | 256, | 256, | 256, | 256, | 256, | 255, | 256 } |
| cram | WRx 46 = | { 256, | 256, | 256, | 256, | 256, | 256, | 255, | 256 } |
| cram | WGx 46 = | { 256, | 256, | 256, | 256, | 256, | 256, | 256, | 256 } |
| cram | WBx 46 = | { 256, | 256, | 256, | 256, | 256, | 256, | 255, | 256 } |
| cram | WRx 47 = | { 256, | 256, | 256, | 256, | 256, | 256, | 256, | 256 } |
| cram | WGx 47 = | { 256, | 256, | 256, | 256, | 256, | 256, | 256, | 256 } |
| cram | WBx 47 = | { 256, | 256, | 256, | 256, | 256, | 256, | 256, | 256 } |

FIG.20

| Coefficient No. | Pixel position |
|---|---|
| 1 | 1～60 (Y1) |
| 2 | 61～120 (Y2) |
| 3 | 121～180 (Y3) |
| 4 | 181～240 (Y4) |
| 5 | 241～300 (Y5) |
| 6 | 301～360 (Y6) |
| 7 | 361～420 (Y7) |
| 8 | 421～480 (Y8) |

CATHODE RAY TUBE AND APPARATUS AND METHOD OF CONTROLLING BRIGHTNESS

BACKGROUND OF THE INVENTION

1. Field of the Invention

The present invention relates to a cathode ray tube, which forms a single screen by joining a plurality of divided screens for image display and an apparatus and a method of controlling brightness of an image displayed on an image display device such as a cathode ray tube.

2. Description of the Related Art

In an image display device such as a television receiver or a monitor device for a computer, a cathode ray tube (CRT), for example, is widely used. A cathode ray tube forms a scan screen according to scanning of an electron beam by irradiating an electron beam toward a phosphor surface from an electron gun provided inside of the cathode ray tube (simply called inside of the tube below). A cathode ray tube comprising a single electron gun is common. However, in recent years, a cathode ray tube with multiple electron guns has been developed.

In this type of cathode ray tube, a plurality of divided screens are formed by a plurality of electron beams emitted from a plurality of electron guns, and image display is performed by forming a single screen by joining the plurality of divided screens. A technology relating to the cathode ray tube comprising the plurality of electron guns is disclosed in, for example, Japanese Examined Utility Model Publication No. Sho 39-25641, Japanese Examined Patent Publication No. Sho 42-4928 and Japanese Unexamined Patent Publication No. Sho 50-17167. The cathode ray tube comprising the plurality of electron guns has such advantages that the depth can be shortened while the screen is enlarged compared to a cathode ray tube with a single electron gun. In order to join the plurality of divided screens, one screen may be obtained simply by joining an end portion of each divided screen linearly, or one screen may be obtained by partially overlapping adjacent divided screens. In FIGS. 23A and 23B, one example of a method for forming a screen is shown where one screen is obtained by overlapping adjacent end portions of two divided screens SL, SR. In this example, the center part of the screen is an overlapped region OL of the two divided screens SL, SR.

In addition to the cathode ray tube, one for forming a single screen by joining a plurality of divided screens for image display also has been developed as a projection type image display apparatus, for example. The projection type image display apparatus enlarges and projects an image displayed in a cathode ray tube or the like on a screen through a projection optical system. A technology related to such a projection type image display apparatus is disclosed in Japanese Examined Patent Publication No. Sho. 54-23762 and Japanese Unexamined Patent Publication No. Hei 5-300452, for example.

In the above-mentioned cathode ray tube with multiple electron guns, it is preferable that the joint area of the divided screens is as inconspicuous as possible when displaying a single screen in which the plurality of divided screens are jointed. However, in the related art, the technique for making the joint area of the divided screens inconspicuous is insufficient. For example, if the brightness is not adjusted properly in the joint area, differences in brightness are caused between adjacent divided screens, which is so called "brightness inconsistencies." In the related art, the technique for improving the brightness inconsistencies is insufficient. The brightness inconsistencies become a big problem in the overlapped region OL between the adjacent divided screens when a single screen is obtained by overlapping the adjacent divided screens SL, SR partially, as the example shown in FIGS. 23A and 23B.

A method for improving the brightness inconsistencies as mentioned above is described in a literature called "SID digest p351–354 23.4: 'The Camel CRT'," for example. The technology described in the literature will be explained with reference to FIGS. 23A and 23B. In this technology, a method is proposed where a video signal corresponding to the overlapped region OL on the screen is multiplied by a predetermined coefficient for correction depending on a position of a pixel in a horizontal direction (the direction of overlapping the screen, X direction in FIG. 23B), that is, a signal level of an inputted signal is changed depending on the position in the direction of overlapping screens for outputting. In this method, the level of the inputted signal for each screen corresponding to the overlapped region OL is corrected to a sine function, for example, such that a values in which brightness levels of the inputted signals at the same pixel positions $P_{i,j}$ ($P_{i,j}$1, $P_{i,j}$2) on each of SL, SR screens overlapped is equal to brightness of an original image at the same pixel position, for example. However, while this method enables to improve the brightness of a part of the brightness area, it is difficult to improve the brightness all over the brightness area, as described in detail below.

Problems in the method of the related art for improving the brightness inconsistencies will be explained in more detail below. Generally, a brightness Y of a screen in a cathode ray tube or the like is expressed in a equation (1) below where a level of an inputted signal is D and a characteristic value for indicating a so-called gamma characteristic, gamma value, is γ. C is generally called perveance, which is a coefficient determined by a structure of an electron gun, for example.

$$Y=C\times D^{\gamma} \tag{1}$$

The brightness distribution will be considered here, where two divided screens SL, SR are partially overlapped to form one single screen as the example shown in FIGS. 23A and 23B. Each brightness, Y'1 and Y'2, of the two divided screens SL, SR in the overlapped region OL can be expressed equations (2) and (3), respectively, similarly to the equation (1) above, where gamma values of the two divided screens SL, SR are γ1, γ2, respectively. In these equations (2), (3), k1 and k2 are coefficients for correction, to be multiplied to an inputted signal D corresponding to an overlapped region OL of a screen, depending on a pixel position $P_{i,j}$. Each of C1 and C2 is a predetermined coefficient corresponding to the coefficient C in the equation (1) above.

$$Y'1=C1\times(k1\times D)^{\gamma 1} \tag{2}$$

$$Y'2=C2\times(k2\times D)^{\gamma 2} \tag{3}$$

Next, if a level of an inputted signal keeps the same value in the whole area of the screen, the brightness should be constant in the whole area, where degrees of brightness of the two divided screens SL, SR in the non-overlapped region are Y1 and Y2, respectively. Here, a condition for not causing the brightness inconsistencies described above can be expressed in an equation (4) below. Y'1+Y'2 is a value in which the degrees of brightness of the two divided screens SL, SR in the overlapped region OL are combined. When the equation (4) is solved, a relationship equation (5) below is derived.

$$Y1=Y2=Y'1+Y'2 \quad (4)$$

$$k1^{\gamma1}+k2^{\gamma2}=1 \quad (5)$$

Here, in the relationship equation (5) above, when the gamma values γ1, γ2 are constant values, the coefficients k1 and k2 for correction can be determined uniquely irrespective of a level of an inputted signal. However, in practice, since the gamma values depend on a level of an inputted signal and a degree of brightness of the screen, as shown in FIG. 24, they are not constant values.

A characteristic graph shown in FIG. 24 indicates a relationship between a level of an inputted signal (horizontal axis) and a degree of brightness (cd/$m^2$) (vertical axis) actually observed on the screen. The graph was obtained by locally connecting measured points (· in FIG. 24) indicating values of inputted signals and values of the brightness with straight lines. In FIG. 24, the values of the inputted signals and the values of the brightness are indicated in logarithm (log). A gamma value γ corresponds to a gradient of the graph (straight lines). Thus, if the gradient of the graph is constant irrespective of the level of the inputted signal, the gamma value γ also would be constant irrespective of the level of the inputted signal. However, in practice, the gradient of the graph differs depending of the level of the inputted signal, and it is understood that the gamma value γ differs depending of the level of the inputted signal. Therefore, in order to satisfy the condition expressed in the equation (5), the plurality of coefficients k1 and k2 for correction depending on the level of the inputted signal are needed.

Especially, in the case of a moving picture, since the level of the inputted signal varies dynamically, it is desirable to perform brightness control such that the coefficient for correction is dynamically changed to an appropriate one depending on the level of the inputted signal even at the same pixel position. However, in the related art, it is controlled by using a fixed coefficient, irrespective of the level of the inputted signal, and the coefficient for correction is not changed dynamically depending on the level of the inputted signal for control. Therefore, conventionally, while it is possible to improve the brightness in one brightness region, the brightness in the other brightness region is not improved.

In the Japanese Unexamined Patent Publication No. Hei-5-300452, the invention is disclosed where a control is performed by preparing, in order to achieve smoothing of the brightness in the overlapped region, a plurality of smooth curves for brightness control, which correspond to the coefficient for correction described above and selecting a curve corresponding to a characteristic and the like of an image projection device among the plurality of smooth curves. The invention disclosed in this publication, an appropriate curve is selected from the plurality of smooth curves, and then, the information of the selected particular smooth curve is stored in a non-volatile memory device to smooth brightness based on the stored smooth curve. By the way, in order to control the brightness depending on a signal level, a means is needed for detecting a signal level. In the publication described above, such a means for detecting a signal level is not disclosed or proposed. In the invention described in the publication above, since only the selected particular smooth curve is stored in the non-volatile memory device, it is obviously impossible to adjust the brightness dynamically while the image display device is in use. In the invention disclosed in the publication, the brightness control is performed with the same smooth curve as far as a new smooth curve is stored in the non-volatile memory device again.

As described above, in the invention described in Japanese Unexamined Patent Publication No. Hei-5-300452, it is not possible to perform the brightness control depending on a signal level. The invention disclosed in the publication is a technology for optimizing the brightness adjustment performed mainly in manufacturing, and it is not suitable for performing the brightness control in real time while the device is in use. Also, the invention disclosed in the publication, a video signal is controlled in an analog fashion by using the smooth curve. However, in order to adjust the brightness precisely, it is desirable to perform the brightness control digitally by using a correction coefficient, which is independent for each unit pixel or each unit pixel array. Further, the invention disclosed in the publication is optimized for a projection type image display device, and it is not suitable for being applied to one for performing direct image display through scanning of an electron beam.

Further, since the gamma value γ is affected by factors other than an inputted signal, it is desirable to determine a coefficient for the brightness correction in view of other different factors. For example, since the gamma value γ differs depending on a color, a different coefficient for correction is needed for each color in color display. Also, in a cathode ray tube, since a characteristic of the gamma value γ differs depending on the difference in characteristics and the like of the electron guns, it is desirable to determine the coefficient for correction in view of the difference in the characteristics of the electron guns.

Further, as described below, it is desirable to change the coefficient for the brightness correction depending on a position of a pixel in the vertical direction (the direction orthogonal to the direction where screens are overlapped, (Y direction in FIG. 23B), in addition to that in the horizontal direction (the direction where screens are overlapped). The reason for it will be explained with reference to FIGS. 23A and 23B. Here, in the overlapped region OL, the brightness of pixels will be considered which exist in horizontally different positions A(1A, 2A), and B(1B, 2B). The degrees of brightness $Y'_{1A}$, $Y'_{1B}$ in the positions 1A, 1B, respectively, where signal processing has been performed by using correction coefficients $k_{1A}$, $k_{1B}$ on an input signal D, is expressed by equations (6) and (7) below as in the equation (1), where gamma values in the positions 1A and 1B in the left side divided screen SL are γ1A, γ1B, respectively. $C_{1A}$ and $C_{1B}$ are predetermined coefficients corresponding to the coefficient C in the equation (1).

$$Y'_{1A}=C_{1A}\times(k_{1A}\times D)^{\gamma 1A} \quad (6)$$

$$Y'_{1B}=C_{1B}\times(k_{1B}\times D)^{\gamma 1B} \quad (7)$$

On the other hand, where gamma values at the positions 2A and 2B in the right side divided screen SR are γ2A, γ2B, respectively, the degree of brightness $Y'_{2A}$, $Y'_{2B}$ at the positions 2A, 2B, after signal processing by using correction coefficients $k_{2A}$, $k_{2B}$ has been performed on an input signal D, is expressed by equations (8) and (9) below. $C_{2A}$, $C_{2B}$ are predetermined coefficients corresponding to the coefficient C in the equation (1).

$$Y'_{2A}=C_{2A}\times(k_{2A}\times D)^{\gamma 2A} \quad (8)$$

$$Y'_{2B}=C_{2B}\times(k_{2B}\times D)^{\gamma 2B} \quad (9)$$

Here, a condition for not causing the brightness inconsistencies is expressed by equations (10), (11) below, when the degrees of brightness are $Y_{1A}$, $Y_{2A}$ $Y_{1B}$, $Y_{2B}$ at positions 1A, 2A, 1B, 2B, respectively, when image display is performed by only a single electron gun. $Y'_{1A}+Y'_{2A}$, $Y'_{1B}+Y'_{2B}$ are a combined of brightness of the two divided screens SL, SR at the pixel positions A, B. Further, by solving the equations (10) and (11), relationship equations (12) and (13) are derived as shown in below.

$$Y_{1A}=Y_{2A}=Y'_{1A}+Y'_{2A} \tag{10}$$

$$Y_{1B}=Y_{2B}=Y'_{1B}+Y'_{2B} \tag{11}$$

$$k_{1A}^{\gamma 1A}+k_{2A}^{\gamma 2A}=1 \tag{12}$$

$$k_{1B}^{\gamma 1B}+k_{2B}^{\gamma 2B}=1 \tag{13}$$

Here, in a cathode ray tube, a transparency ratio and emitting light efficiency of light are different depending on a position of a phosphor surface. Therefore, as the gamma value γ differs depending on a position of a phosphor surface, an equation (14) below holds. Further, from the equations (12)–(14), an equation (15) holds. From the equation (15), it is understood that it is desirable not only to control the brightness depending on a pixel position in the horizontal direction as done in the conventional manner, but also to control the brightness depending on a position in the vertical direction.

$$\gamma 1A \neq \gamma 2A,\ \gamma 1B \neq \gamma 2B \tag{14}$$

$$k_{1A} \neq k_{2A},\ k_{1B} \neq k_{2B} \tag{15}$$

SUMMARY OF THE INVENTION

The present invention is made in view of those problems, and it is an object of the present invention to provide a cathode ray tube and an apparatus and a method of controlling brightness, mainly enables to control brightness of a plurality of divided screens properly depending on a signal level of a video signal so that a jointed part is not conspicuous.

A cathode ray tube of the present invention performs color image display by forming a single screen by joining a plurality of divided screens by partially overlapping each other. The plurality of divided screens are formed by scanning of the plurality of electron beams. The cathode ray tube comprises a signal dividing means for dividing an inputted video signal into a plurality of video signals for the plurality of divided screens, a storage means for storing a plurality of correction coefficients for each color corresponding to a plurality of signal levels, a signal level detection means for detecting a signal level of an inputted video signal for each color, and a calculating means for calculating an appropriate correction coefficient to be used for modulation control of brightness among a plurality of correction coefficients stored in the correction coefficient storage means. The cathode ray tube further comprises a brightness modulation means for performing control depending on a signal level on each of the plurality of video signals for divided screens by using a correction coefficient for each color calculated through the calculating means such that the sum total of degrees of brightness at the same pixel position in the overlapped region on the screen, which is scanned based on the plurality of video signals for the divided screens, is equal to a degree of brightness at the same pixel position on an original image and a plurality of electron guns for emitting a plurality of electron beams, which scans the plurality of divided screens based on a video signal for the divided screens where modulation control has been performed by the brightness modulation means.

Further, an apparatus for controlling brightness of the present invention performs brightness control of an image displayed in an image display device, which forms a single screen by joining a plurality of divided screens by partially overlapping each other. The apparatus for brightness comprises a signal level detection means for detecting a signal level of an inputted video signal, a storage means for storing a plurality of correction coefficients corresponding to a plurality of signal levels, and a calculating means for calculating an appropriate correction coefficient to be used for modulation control of brightness among a plurality of correction coefficients stored in the correction coefficient storage means based on the signal level detected by the signal level detection means. The apparatus for brightness control further comprises a brightness modulation means for performing control depending on a signal level on each of the plurality of video signals for the divided screens by using a correction coefficient calculated through the calculating means such that the sum total of degrees of brightness at the same pixel position in the overlapped region on the screen, which is scanned based on the plurality of video signals for the divided screens, is equal to a degree of brightness at the same pixel position on an original image.

Further, a method for brightness control of the present invention comprises steps of detecting a signal level of an inputted video signal, storing a plurality of correction coefficients corresponding to a plurality of signal levels in a storage means, calculating an appropriate correction coefficient to be used for modulation control of brightness, among a plurality of correction coefficients stored in the storage means; and performing modulation control of brightness depending on a signal level on each of the plurality of video signals for the divided screens by using a correction coefficient calculated so that a sum total of degrees of brightness at the same pixel position in the overlapped region on the screen, which is scanned based on the plurality of video signals for the divided screens, is equal to a degree of brightness at the same pixel position on an original image.

In the cathode ray tube and the apparatus and the method for brightness control according to the present invention, a plurality of correction coefficients associated depending on a plurality of signal levels are stored in the storage means, and an appropriate correction coefficient to be used for modulation control of brightness, is calculated among a plurality of correction coefficients stored in the storage means based on a signal level. Next, modulation control of brightness depending on a signal level is performed on each of a plurality of video signals for a divided screen by using the calculated correction coefficient so that a sum total of degrees of brightness at the same pixel position in the overlapped region on the screen scanned based on a plurality of video signals is equal to a degree of brightness at the same pixel position on an original image. As a specific example of the modulation control of brightness, operation processing is performed where a video signal is multiplied by a correction coefficient in order to change a degree of brightness.

BRIEF DESCRIPTION OF THE DRAWINGS

FIG. 11 is an illustrative diagram for showing one example of correction coefficients for the left side of the divided screen, which are used in brightness control depending on a signal level;

FIG. 12 is an illustrative diagram for showing one example of correction coefficients for the right side of the divided screen, which are used in brightness control depending on a signal level;

FIG. 13 is an illustrative diagram for showing one example of a method for dividing a signal level of a video signal;

FIG. 14 is an illustrative diagram showing one example of a correspondence relationship between a correction coefficient and a signal level of a video signal;

FIG. 19 is an illustrative diagram showing one example of correction coefficients for the left side of the divided screen, which are used in a cathode ray tube according to the second embodiment of the present invention;

FIG. 20 is an illustrative diagram which shows an example of correction coefficients for the right side of the divided screen, which are used in a cathode ray tube according to the second embodiment of the present invention.

DETAILED DESCRIPTION OF THE PREFERRED EMBODIMENTS

Preferred embodiments of the invention will be described in detail with reference to the drawings.

[First Embodiment]

Figure 1A:
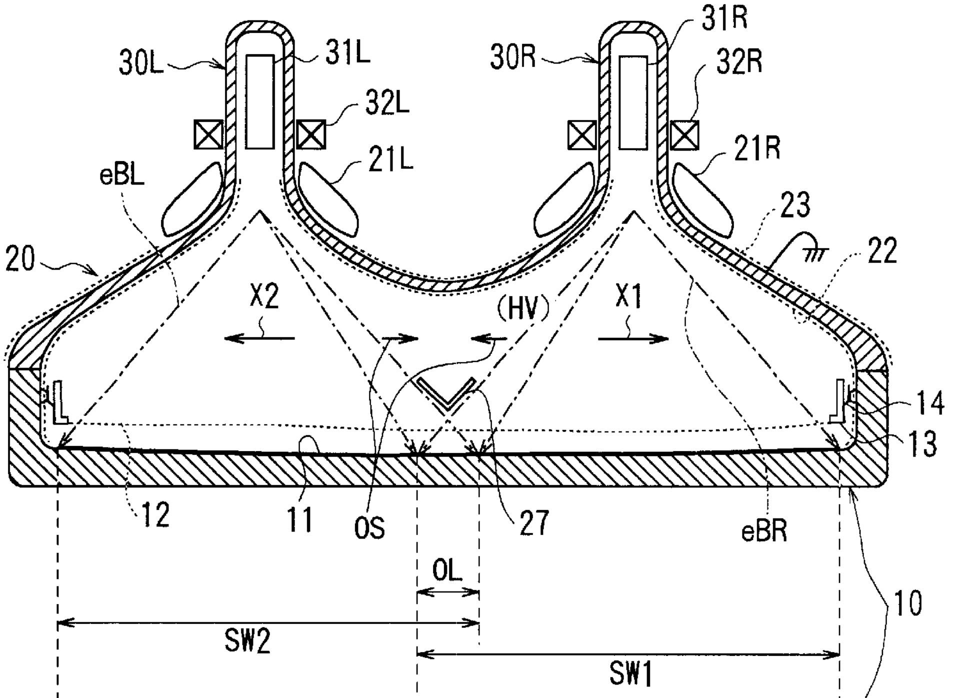
FIGS. 1A and 1B are a cross section and a front view, respectively, showing a cathode ray tube schematically according to a first embodiment of the present invention with one example of a scanning direction of an electron beam.
Figure 1B:
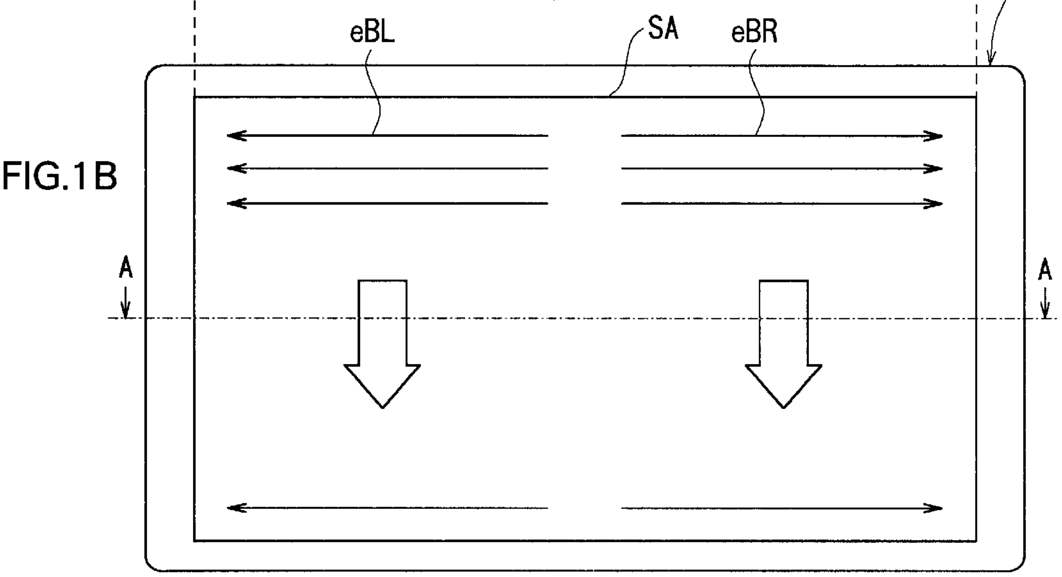

As shown in FIGS. 1A and 1B, a cathode ray tube according to this embodiment comprises a panel portion 10 including a phosphor surface 11 inside, and a funnel portion 20 formed integrally with the panel portion 10. On the left and the right sides of the rear-end portion of the funnel portion 20, two long-and-narrow-shaped neck portions 30L and 30R each including built-in electron guns 31L and 31R are formed, respectively. As a whole, the cathode ray tube takes a double-funnel-shaped figure by the panel portion 10, the funnel portion 20, and the neck portions 30L and 30R. The outer portion forming the cathode ray tube is also called an outer vessel. Each opening of the panel portion 10 and the funnel portion 20 is fused to each other so that it is capable of keeping high-vacuum condition inside. In the phosphor surface 11, a striped pattern (not shown) made of phosphors is formed. It is the phosphor surface 11 which mainly corresponds to one specific example of an “image display means” in the present invention.

Inside of the cathode ray tube, a color selection mechanism 12 made of a thin metal plate is positioned to face the phosphor surface 11. The color selection mechanism 12 is also called an aperture grill, a shadow mask or the like depending on the method being employed. The periphery of the color selection mechanism 12 is supported by a frame 13 and is installed on the inside surface of the panel portion 10 through a supporting spring 14. An anode portion (not shown) for applying anode voltage HV is provided in the funnel portion 20. Deflection yokes 21L and 21R for deflecting respective electron beams eBL and eBR irradiated from the electron guns 31L and 31R, respectively, and convergence yokes 32L and 32R for performing convergence of each electron beam for each color irradiated from respective electron guns 31L and 31R are installed in the peripheral portion extending from the funnel portion 20 to each of neck portions 30L and 30R. The inside surface extending from the neck 30 to the phosphor surface 11 of the panel portion 10 is covered with an inside conductive film 22. The inside conductive film 22 is electrically coupled to the anode portion (not shown) and is kept to the anode voltage HV. The peripheral surface of the funnel portion 20 is also covered with an external conductive film 23.

The each of electron guns 31L and 31R has a configuration (not shown) in which a plurality of electrodes (grids) is arranged in the front portion of a hot-cathode structure comprising three cathodes (hot cathodes) for Red=R, Green=G and Blue=B. Each electrode within the electron guns 31L and 31R performs control, acceleration and the like of the electron beams eBL and eBR emitted from the cathodes. Each of the electron beams for each color emitted from the electron guns 31L and 31R is irradiated onto the phosphors of the corresponding color on the phosphor surface 11 through the color selection mechanism 12 and the like, respectively.

In the cathode ray tube of this embodiment, the left half of the screen and an area extending into the right half of the screen are drawn by the electron beam eBL from the electron gun 31L provided on the left side, and the right half of the screen and an area extending into the left half of the screen are drawn by the electron beam eBR from the electron gun 31R provided on the right side. The edges of the left and right divided screens are joined with the edges being overlapped each other. Thus, a single screen SA is formed to display an image. Accordingly, the center portion of the screen SA becomes an overlapped region OL where both right and left screens partially overlap. The phosphor surface 11 in the overlapped region OL is for both of the electron beams eBL and eBR.

In FIG. 1B, as one example of scanning directions of the electron beams eBL and eBR, the line scan of the electron beam eBL from the left side electron gun 31L is performed in a horizontal deflection direction from right to left (X2 direction in FIG. 1A), and the field scan is performed in a vertical deflection direction from the top to the bottom. Also, in FIG. 1B, the line scan of the electron beam eBR from the right side electron gun 31R is performed in a horizontal deflection direction from left to right (X1 direction in FIG. 1A), and the field scan is performed in a vertical deflection direction from the top to the bottom. Accordingly, in the example shown in FIG. 1B, as a whole, the line scan of each of electron beams eBL and eBR is performed from the center to the right or left side of the screen in a horizontal direction, which is the opposite direction from each other, and the field scan is performed from the top to the bottom as in the common cathode ray tube.

Figure 2:
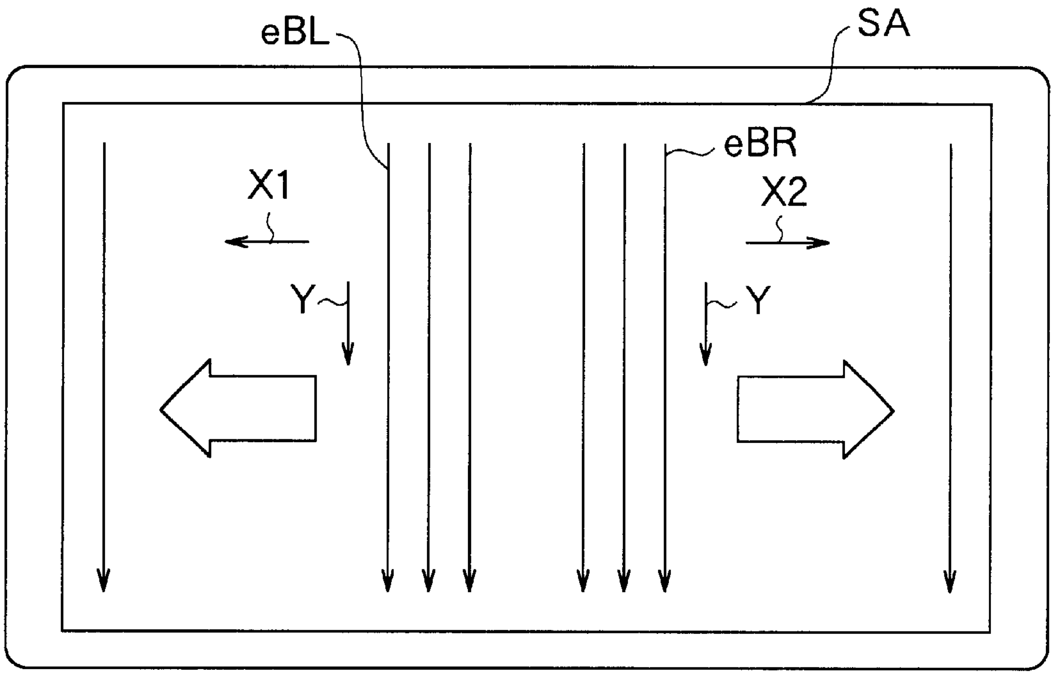
FIG. 2 is an illustrative diagram for showing another example of the scanning direction of the electron beam in the cathode ray tube shown in FIG. 1.

For example, as shown in FIG. 2, the scanning of the electron beams eBL and eBR may be performed in a scanning direction different from those shown in FIG. 1B. In the example shown in FIG. 2, the line scan by eBL and eBR is performed from the top to the bottom (Y direction shown in FIG. 2), and the field scans are performed from the center to the right or left side of the screen in a horizontal direction, which is the opposite direction from each other. Thus, the example shown in FIG. 2 is the reversed of the one shown in FIG. 1B wherein the line scan and the field scan by respective electron beams eBL and eBR.

In the cathode ray tube, a V-shaped beam shield 27 as a shielding member against the electron beams eBL and eBR is provided in an overscanned region OS of the electron beams eBL and eBR on the joined side (the center of the whole screen in this embodiment) of the left and right divided screens adjacent to each other, so that the electron beams eBL and eBR, which have overscanned the overscanned region OS, do not unnecessarily reach the phosphor surface 11 and emit light. The beam shield 27 is provided by using the frame 13, as a base, for example, supporting the color selection mechanism 12. The beam shield 27 becomes the anode voltage HV by being electrically coupled to the inside conductive film 22 through the frame 13.

In this embodiment, the overscanned region is the outer region of each scanned region of the electron beams eBL and eBR forming the effective screen in each scanned region of the electron beams eBL and eBR. In FIGS. 1A and 1B, a region SW1 is an effective screen on the phosphor surface 11 of the electron beam eBR in a horizontal direction, and a region SW2 is an effective screen on the phosphor surface 11 of the electron beam eBL in a horizontal direction.

Figure 3:
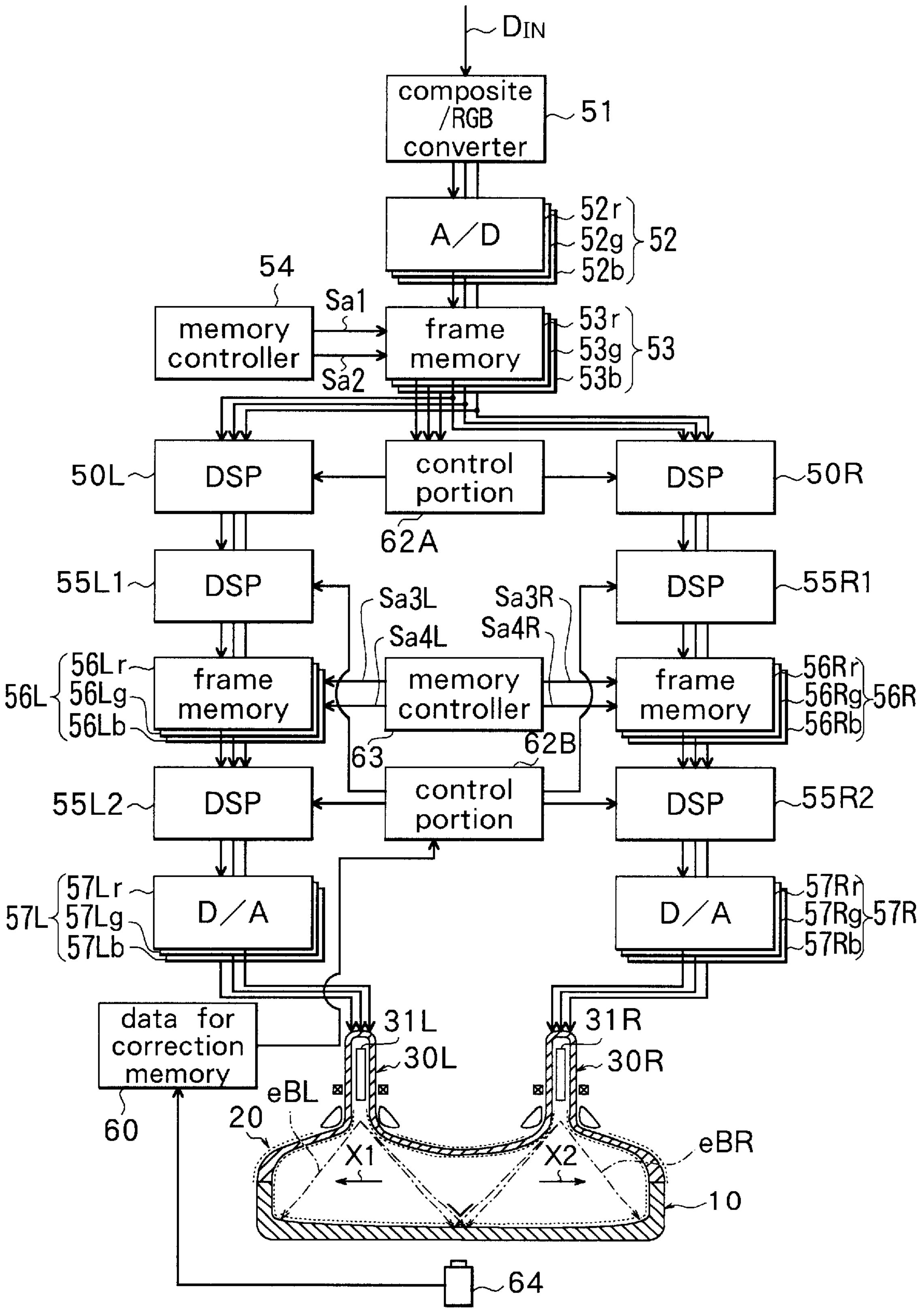
FIG. 3 is a block diagram showing one compositional example of a signal processing circuit in the cathode ray tube shown in FIG. 1.

FIG. 3 shows a circuit example for inputting an analog composite signal in the NTSC (National Television System Committee) format as an inputted signal (video signal) $D_{IN}$ and, then, displaying a moving image based on the signal. Here, the signal processing circuit shown in FIG. 3 corresponds to one specific example of the "brightness control apparatus" in the present invention.

The cathode ray tube according to this embodiment includes a composite/RGB converter 51 which converts an analog composite signal inputted one-dimensionally as a video signal $D_{IN}$ to signals for each of colors, R, G, B, for outputting, an analog/digital signal ("A/D" in the followings) converter 52 (52*r*, 52*g*, 52*b*) which converts analog signals for each of colors outputted from the composite/RGB converter 51, the frame memory 53 which stores digital signals for each color, outputted from the A/D converter 52, two-dimensionally in frame, and the memory controller 54 which generates a write address and a readout address of image data for the frame memory 53. An SDRAM (synchronous dynamic random access memory) is used for the frame memory 53, for example.

Further, the cathode ray tube includes a DSP (digital signal processor) circuit 50L, a DSP circuit 55L1, a frame memory 56L (56L*r*, 56L*g*, 56L*b*), a DSP circuit 55L2 and a digital/analog signal ("D/A" in the followings) converter 57L (57L*r*, 57L*g*, 57L*b*), which perform control on image data for the left side screen among image data for each color stored in the frame memory 53, and a DSP circuit 50R, a DSP circuit 55R1, a frame memory 56R (56R*r*, 56R*g*, 56R*b*), a DSP circuit 55R2 and a D/A converter 57L (57R*r*, 57R*g*, 57R*b*), which perform control on image data for the right side screen among image data for each color stored in the frame memory 53. The DSP circuits 50L and 50R are circuits for brightness control, mainly provided for modulating and controlling brightness. On the other hand, other DSP circuits 55L1, 55L2, 55R1, 55R2 (these four DSP circuits are simply called "DSP circuit 55" in general) are circuits for positional control, mainly provided for correcting a position.

Further, the cathode ray tube includes a data for correction memory 60, a control portion 62A for brightness control, a control portion 62B and a memory controller 63. The data for correction memory 60 stores data for correction for each color for correcting a display condition of an image. The control portion 62A for brightness control is inputted image data for each color stored in the frame memory 53 and instructs a signal processing method, which should be done for brightness control for the DSP circuits 50L and 50R for brightness control, for example. The control portion 62B is inputted data for correction from the data for correction memory 60 and instructs an operation method, which should be done for position correction for the DSP circuit 55 for position correction, for example. The memory controller 63 generates a write address and a readout address of image data for the frame memories 56L and 56R. The control portion 62A has a memory, not shown, for storing a plurality of correction coefficients for each color corresponding to a plurality of signal levels used in brightness control.

The control portion 62A mainly corresponds to one specific example of a "signal level detection means" and a "calculating means" in the present invention. Further, the DSP circuits 50L and 50R correspond to one specific example of a "brightness modulating means" in the present invention.

The data for correction memory 60 has memory region for each color to store data for correction for each color in each memory region. The data for correction to be stored in the data for correction memory 60 is generated when a cathode ray tube is manufactured, for example. The data for correction is generated by measuring a distorted amount, a misconvergence amount or the like of an image displayed in the cathode ray tube. A device for generating the data for correction is composed by an image pickup apparatus 64 to display an image in the cathode ray tube and a data for correction generating means to generate the data for correction on the basis of an image displayed the image pickup apparatus 64, not shown, for example. The image pickup apparatus 64 images an image displayed in the cathode ray tube. The image pickup apparatus 64 includes an imaging element such as a CCD (charge coupled device) and images a screen displayed on the surface of the cathode ray tube for each of colors R, G, B, to output the imaging screen as image data for each color. The data for correction generating means is composed by a microcomputer or the like and generates, as data for correction, data related to a moving amount of each pixel from a proper display position in discrete, two-dimensional image data, which represent the image imaged by the image pickup apparatus 64.

The DSP circuits 50L and 50R for brightness control and the DSP circuit 55 (55L1, 55L2, 55R1, 55R2) for position correction are composed by one chip of a generic LSI (large-scale integrated circuit), for example. The DSP circuits 50L and 50R and the DSP circuits 55 follow instructions from the control portions 62A and 62B in order to correct the brightness in the overlapped region OL and to correct image distortion, mis-convergence, and the like that the cathode ray tube has and perform each kind of operation processing (signal processing) for inputted image data. Especially, the control portion 62B instructs an operation method for correcting a position mainly to each of DSP circuit 55 for position correction based on data for correction stored in the data for correction memory 60.

Here, the DSP circuit 50L performs signal processing related to brightness mainly on image data for the left side divided screen among image data for each color stored in the frame memory 53 and outputs for each color image data, on which the signal processing has been performed, to the DSP circuit 55L1. Further, the DSP circuit 55L1 performs correction processing of a position in the horizontal direction mainly on image data for each color outputted from the DSP circuit 50L and outputs the correction result for each color to the frame memory 56L. The DSP circuit 55L2 performs correction processing of a position mainly in the vertical direction on image data for each color stored in the frame memory 56L and outputs the correction result for each color to the D/A converter 57L.

The DSP circuits 50R performs signal processing related mainly to brightness on image data for the right side divided screen among the image data for each color stored in the frame memory 53 and outputs the corrected image data for each color to the DSP circuit 55R1. The DSP circuit 55R1 performs correction processing of a position in the horizontal direction mainly on image data for each color outputted from the DSP circuit 50R and outputs the correction result for each color to the frame memory 56R. The DSP circuit 55R2 performs correction processing of a position in the vertical direction mainly on image data for each color stored in the frame memory 56R and outputs the correction result for each color to the D/A converter 57R.

The DSP circuits 50L and 50R for brightness control and the control portion 62A can perform modulation control of brightness on a video signal depending on a horizontal pixel position and a signal level. The signal processing performed in the DSP circuits 50L and 50R and the control portion 62A is processing where a video signal is multiplied by a correction coefficient in order to change the degree of brightness, as described below.

Each of the D/A converters 57L and 57R converts the operated image data outputted from each of DSP circuits 55L2, 55R2, respectively, to an analog signal and outputs the analog signal to the side of respective electron beams 31L and 31R.

Each of the frame memories 56L and 56R stores the operated image data outputted from each of DSP circuits 55L1, 55R1, in frames, respectively, and outputs the stored image data for each color. The frame memories 56L and 56R are memories, which allow rapid random access, and an SRAM (static RAM) is used for them, for example. If the frame memories 56L and 56R are constructed by a single memory allowing rapid random access, a frame passing operation occurs while performing image data writing and reading operations, which causes image turbulence. Thus, two memories (double buffer) are used respectively, for the constructions of the frame memories 56L and 56R. The frame memories 56L and 56R perform the writing operation on the image data by following an order of a write address generated in the memory controller 63. Further, they perform the reading operation on the image data by following an order of a read-out address generated in the memory controller 63.

The memory controller 63 can generate a write address of image data for frame memories 56L and 56R. It can also generate a read-out address of the image data stored in the frame memories 56L and 56R in an order different from the order of the write address. Since the orders of the read-out address and the write address can be generated separately in this embodiment, image data written in the frame memories 56L and 56R can be modified such that the image data can be read out with involving rotation and inversion of an image, for example. Thus, in this embodiment, the image conversion is performed on image data outputted from the DSP circuits 55L1 and 55R1 properly such that the image condition is suitable for the vertical correction operation done in the DSP circuits 55L2, 55R2.

Next, description below shows an operation of the cathode ray tube in the construction described above.

First of all, the general operation of the cathode ray tube will be described. First, an analog composite signal inputted as a video signal $D_{IN}$ is converted to a video signal for each of colors, R, G, B by the composite/RGB converter 51 (FIG. 3). Next, the video signal is converted to a digital video signal for each color by the A/D converter 52. It is preferable to perform the IP (interlace progressive) conversion here because it makes subsequent processing easier. The digital video signal outputted from the A/D converter 52 is stored in the frame memory 53 for each color in frames by following a control signal Sa1, which indicates a write address generated in the memory controller 54. The image data in frame stored in the frame memory 53 are read out by following a control signal Sa2, which indicates a readout address generated in the memory controller 54 to output to the DSP circuits 50L and 50R for brightness control and the control portion 62A.

Among the image data for each color stored in the frame memory 53, signal processing mainly related to brightness is performed on image data for the left side divided screen through the function of the DSP circuit 50L based on a signal processing method instructed from the control portion 62A. Then, operation processing mainly for correcting an image positionally is performed on it through the function of the DSP circuit 55L1, the frame memories 56L and the DSP circuit 55L2 based on data for correction stored in data for correction memory 60. The image data for the left side divided screen on which the operation processing has been performed is converted to an analog signal through the D/A converter 57L to be supplied to a cathode, not shown, positioned inside of the left side electron gun 31L as cathode drive voltage.

Among the image data for each color stored in the frame memory 53, signal processing mainly related to brightness is performed on an image data for the right side divided screen through the function of the DSP circuit 50R based on a signal processing method instructed by the control portion 62A. Then, operation processing mainly for correcting an image positionally is performed on it through the function of the DSP circuit 55R1, the frame memories 56R and the DSP circuit 55R2 based on data for correction stored in data for correction memory 60. The image data for the right side divided screen on which the operation processing has been performed is converted to an analog signal through the D/A converter 57R, and is supplied to a cathode which is not shown, positioned inside of the right side electron gun 31R as cathode driven voltage.

Electron beams eBL and eBR is projected from electron guns 31L and 31R, according to the given cathode driving voltage, respectively. The cathode ray tube of this embodiment is capable of color display. In practice, the cathodes for each of colors, R, G, and B, are provided in each of electron guns 31L and 31R, and the electron beams for each color are projected from each of electron guns 31L and 31R.

The electron beams eBL and eBR for each color projected from the electron guns 31L and 31R are converged by the magnetic function of the convergence yokes 32L and 32R, respectively. Thus, the electron beams scan the whole surface of the phosphor surface 11, deflected by the magnetic function of the deflection yokes 21L and 21R, and a desired image is displayed on the screen SA (FIGS. 1A and 1B) on the surface of the panel portion 10. At this time, the left half of the screen and the area extending into the right half of the screen are drawn by the electron beam eBL while the right half of the screen and the area extending into the left half of the screen are drawn by the electron beam eBR. As a whole, a single screen SA is formed by partially joining the end portions of the left and the right divided screens formed in the manner described above.

Next, the description of the specific examples of signal processing for brightness correction and operation processing for positional correction for an inputted video signal $D_{IN}$ in the cathode ray tube according to this embodiment will be shown.

First of all, the description of the specific example of the operation processing performed on image data for the left side divided screen in the processing circuit shown in FIG. 3 with reference to FIGS. 4A–4E will be shown. As an example of the operation processing, a specific example wherein the line scans by each of eBR and eBR are performed from the top to the bottom vertically, and the field scans are performed from the center to the right or left side of the screen horizontally to the opposite direction from each other, as shown in FIG. 2 will be shown.

Figures 4A, 4B, 4C, 4D, 4E:
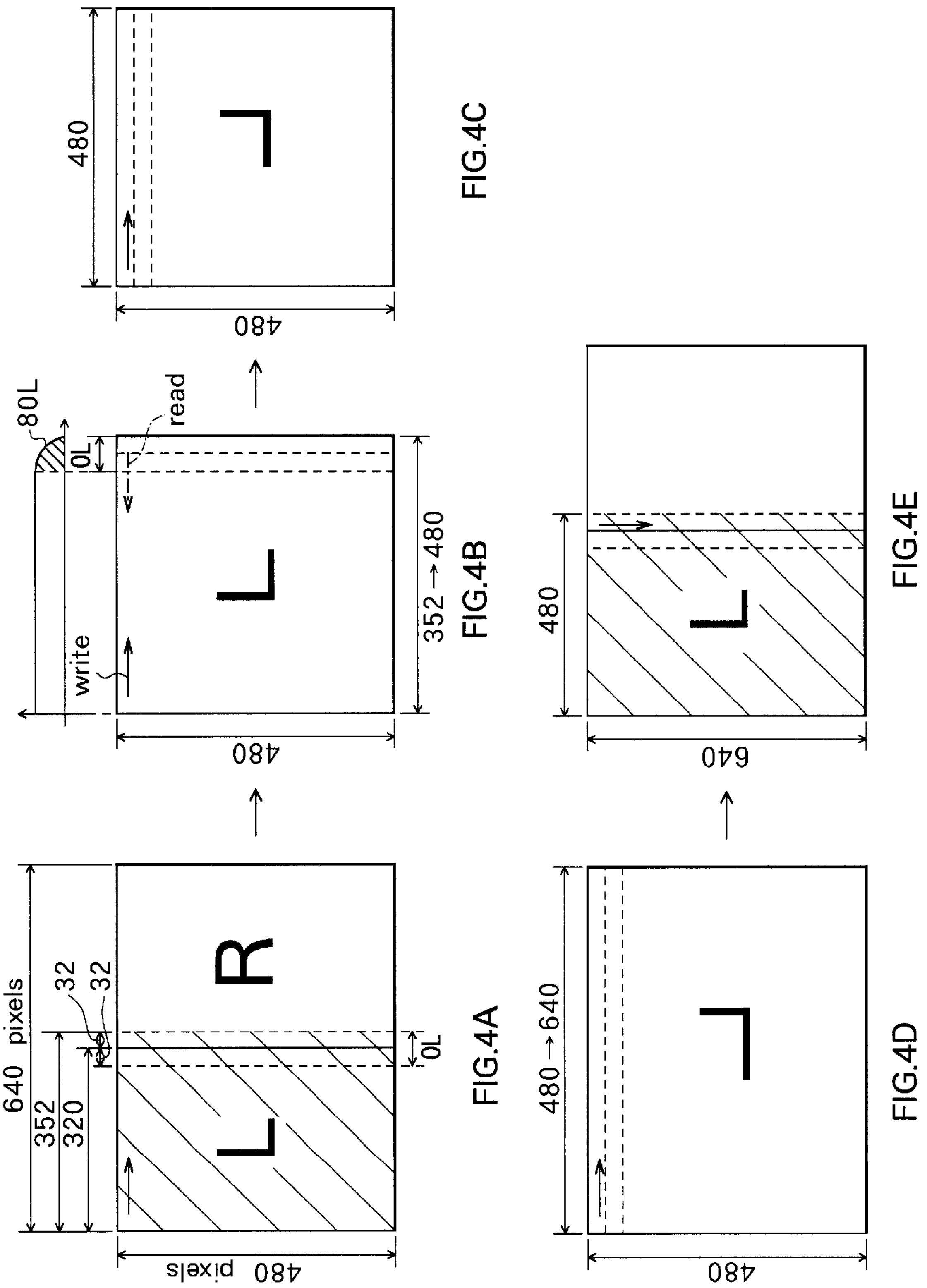
FIGS. 4A–4E are illustrative diagrams for showing a specific example of operation processing performed on image data for the left side of the divided screen in the processing circuit shown in FIG. 3.

FIG. 4A schematically shows an image data for the left side divided screen to be read out from the frame memory 53 and to be inputted to the DSP circuit 50L. An image data of 640 pixels wide by 480 pixels high, for example, is written into the frame memory 53. Here, among the image data of 640 pixels wide by 480 pixels high, the center region of 62 pixels wide (left side 32 pixels+right side 32 pixels) by 480 pixels high is an overlapped region OL of the left and the right divided screens. Among the image data written into the frame memory 53, the left side image data of 352 pixels wide by 480 pixels high is read out, shown as a diagonally shaded area in FIG. 4A, and is inputted to the DSP circuit 50L.

FIG. 4B schematically shows an image data to be written into the frame memories 56L after correction processing is processed on the image by the DSP circuit 50L and DSP circuit 55L1. The DSP circuit 50L performs the operation processing for correcting brightness in the overlapped region OL on an image data of 352 pixels wide by 480 pixels high shown as the shaded area in FIG. 4A independent of the positional correction before the DSP circuit 55L1 performs the correction processing. FIG. 4B shows an example of a modulation waveform 80L, which indicates correction of brightness in the left side divided screen, corresponding to the image data.

The DSP circuit 55L1 performs the operation processing involving horizontal correction on an image data of 352 pixels wide by 480 pixels high, which is shown as the shaded area in FIG. 4A after the DSP circuit 50L performs the brightness correction processing. The operation processing enlarges the image horizontally to 352 pixels wide by 480 pixels high as shown in FIG. 4B, and generates an image data of 480 pixels wide by 480 pixels high. At the same time, when the image is enlarged, the DSP circuit 55L1 performs operation processing for correcting horizontal distortion and the like based on data for correction stored in the data for correction memory 60. Further, in order to extend the number of pixel, it is necessary to interpolate data related to a pixel, which does not exist in the original image.

In the frame memory 56L, the image data, on which the operation processing is performed in the DSP circuit 50L and the DSP circuit 55L1, are stored for every color by following a control signal Sa3L, which indicates a write address generated in the memory controller 63. In the example shown in FIG. 4B, image data is written sequentially from upper left as a starting point to the right direction. The image data stored in the frame memory 56L are read out for each color following a control signal Sa4L, which indicates a readout address generated in the memory controller 63 and is inputted to the DSP circuit 55L2. Here, in this embodiment, the order of the write addresses and the order of the readout addresses for the frame memory 56L generated in the memory controller 63 are different. In the example shown in FIG. 4B, the readout address is arranged such that the image data is read out sequentially from the upper right as a starting point to the downward direction.

FIG. 4C schematically shows an image data to be read out from the frame memory 56L and inputted to the DSP circuit 55L2. As described above, in this embodiment, as the order of the readout addresses for the frame memory 56L directs from the upper right as a starting point to the downward direction, the image to be inputted to the DSP circuit 55L2 is converted to rotate counterclockwisely by 90° to the state of an image shown in FIG. 4B.

The DSP circuit 55L2 performs the operation processing involving vertical correction on an image data (FIG. 4C) of 480 pixels wide by 480 pixels high, which has been read out from the frame memory 56L. The operation processing enlarges the image horizontally from 480 pixels to 640 pixels as shown in FIG. 4D, and generates image data of 640 pixels wide by 480 pixels. When the image is enlarged, the DSP circuit 55L2 performs operation processing for correcting vertical distortion and the like based on data for correction stored in the data for correction memory 60 at the same time.

Based on the image data (FIG. 4D) obtained through the operation processing as described above, through the scanning of the electron beam eBL from the top to the bottom, the image as shown in the shaded area in FIG. 4E is displayed on the left side of the phosphor surface 11. As described above, in this embodiment, since the correction processing is performed on the inputted image data in view of distortion and the like, the left side image displayed on the phosphor surface 11 is arranged to be properly displayed without distortion and the like.

Next, a description of a specific example of operation processing to be performed on the image data for the right side divided screen will be shown with reference to FIGS. 5A–5E.

Figures 5A, 5B, 5C, 5D, 5E:
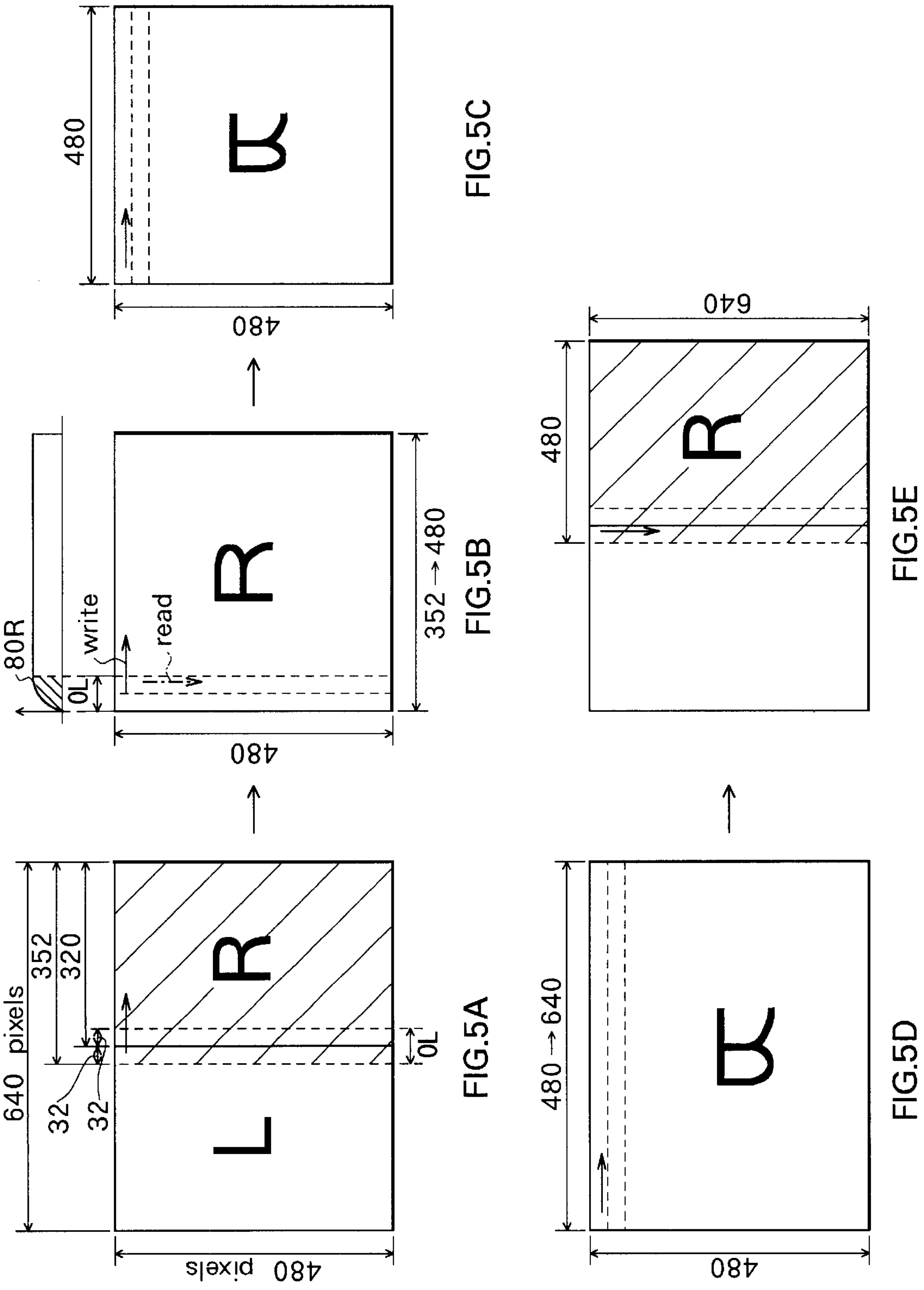
FIGS. 5A–5E are illustrative diagrams for showing a specific example of operation processing performed on image data for the right side of the divided screen in the processing circuit shown in FIG. 3.

FIG. 5A schematically shows an image data for the right side divided screen to be read out from the frame memory 53 and inputted to the DSP circuit 50R. Among the image data of 640 pixels wide by 480 pixels high, for example, written into the frame memory 53, the right side image data of 352 pixels wide by 480 pixels high are read out, shown as a diagonally shaded area in FIG. 5A, for example, and are inputted to the DSP circuit 50R.

FIG. 5B shows an image data to be written into the frame memories 56R after correction processing is performed on the image by the DSP circuit 50R and DSP circuit 55R1 in this embodiment. The DSP circuit 50R performs the operation processing for correcting brightness in the overlapped region OL on an image data of 352 pixels wide by 480 pixels high shown as the shaded area in FIG. 5A independent of the positional correction before the DSP circuit 55R1 performs the correction processing. FIG. 5B shows an example of a modulation waveform 80R, which indicates correction of brightness in the right side divided screen, corresponding to the image data.

The DSP circuit 55R1 performs the operation processing involving horizontal correction on an image data of 352 pixels wide by 480 pixels high shown as the shaded area in FIG. 5A after the DSP circuit 50R performs the brightness correction processing. The operation processing enlarges the image horizontally to 352 pixels wide by 480 pixels as shown in FIG. 5B, and generates an image data of 480 pixels wide by 480 pixels high. When the image is enlarged, the DSP circuit 55R1 operation processing is performed at the same time, for correcting horizontal distortion and the like based on data for correction stored in the data for correction memory 60.

In the frame memory 56R, the image data, on which the operation processing has been performed in the DSP circuit 50R and the DSP circuit 55R1, are stored for every color by following a control signal Sa3R, which indicates a write address generated in the memory controller 63. In the example shown in FIG. 5B, an image data is written sequentially from upper left as a starting point to the right direction. The image data stored in the frame memories 56R are read out for each color by following a control signal Sa4R, which indicates a readout address generated in the memory controller 63, and are inputted to the DSP circuit 55R2. Here, in this embodiment, the order of the write addresses and the order of the readout addresses for the frame memories 56R generated in the memory controller 63 are different. In the example shown in FIG. 5B, the readout address is arranged such that the image data are read out sequentially from the upper left as a starting point to the downward direction.

FIG. 5C schematically shows an image data to be read out from the frame memories 56R and inputted to the DSP circuit 55R2. As described above, in this embodiment since the order of the readout addresses for the frame memory 56R directs from the upper left as a starting point to the downward direction, the image to be inputted to the DSP circuit 55R2 is converted to rotate counterclockwisely by 90° as well as to mirror-reverse to the state of an image shown in FIG. 5B.

The DSP circuit 55R2 performs the operation processing involving vertical correction on image data (FIG. 5C) of 480 pixels wide by 480 pixels high, read out from the frame memory 56R. The operation processing enlarges the image horizontally from 480 pixels to 640 pixels as shown in FIG. 5D, and generates an image data of 640 pixels wide by 480 pixels high. When the image is enlarged, the DSP circuit 55R2 performs operation processing for correcting vertical distortion and the like based on data for correction stored in the data for correction memory 60 at the same time.

Based on the image data (FIG. 5D) obtained through the operation processing as described above, through the scanning of the electron beam eBL is performed from the top to the bottom the image as shown in the shaded area in FIG. 5E is displayed on the right side of the phosphor surface 11. As described above, in this embodiment, the correction processing is performed on the inputted image data in view of distortion and the like, the right side image displayed on the phosphor surface 11 is arranged to be properly displayed without distortion and the like. Further, on the left and the right divided screens shown in FIG. 4E and FIG. 5E, brightness correction in the overlapped region OL are properly performed and correction relating to each of distortion and the like are properly performed, respectively. Thus, it allows proper image display with the joined part inconspicuous in brightness and position when the left and the right screens are joined.

Next, with reference to FIGS. 6–8, the operation processing for the positional correction of an image by using data for correction will be described in detail.

Figures 6A, 6B, 6C:
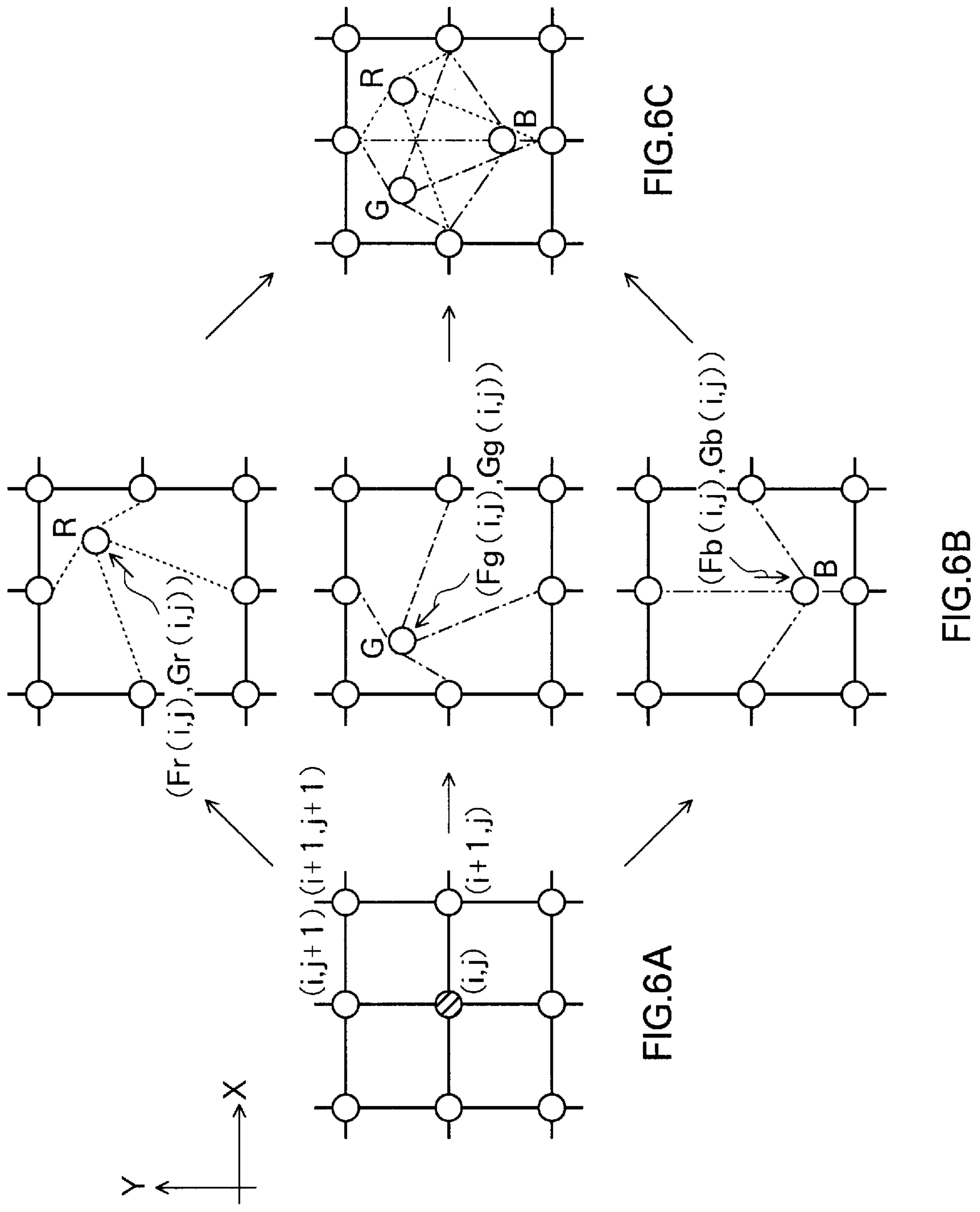
FIGS. 6A–6C are illustrative diagrams for schematically showing data for correction used in the processing circuit shown in FIG. 3.

First of all, data for correction to be stored in the data for correction memory 60 (FIG. 3) will be generally described with reference to FIGS. 6A–6C. Data for correction is indicated by a moving amount with regard to a reference point arranged in grid, for example. A pixel for each color located in a grid point (i,j) is as shown in FIG. 6B, respectively, by moving them for each of their moving amounts, where the grid point (i,j) shown in FIG. 6A is a reference point; a moving amount in the X direction for the R color is Fr(i,j); a moving amount in the Y direction is Gr(i,j), a moving amount in the X direction for the G color is Fg(i,j); a moving amount in the Y direction is Gg(i,j), a moving amount in the X direction for the B color is Fb(i,j); and a moving amount in the Y direction is Gb(i,j). The image as shown in FIG. 6C can be obtained by combining each image shown in FIG. 6B. When the image obtained thereby is displayed on the phosphor surface 11, the misconvergence and the like are corrected as a result, due to distortion characteristics of the cathode ray tube and influences of geomagnetism and the like, and R, G, B pixels are displayed on the same point on the phosphor surface 11. In the processing circuit shown in FIG. 3, correction based on the moving amount in the X direction is performed in the DSP circuits 55L1 and 55R1, for example, and correction based on the moving amount in the Y direction is performed in the DSP circuits 55L2 and 55R2, for example.

Next, the operation processing by using data for correction will be explained. Though the horizontal and the vertical corrections of an image may be explained together at the same time to simplify the explanation, as described above, the vertical and the horizontal image corrections are performed separately in the signal processing circuit shown in FIG. 3.

Figure 7A:
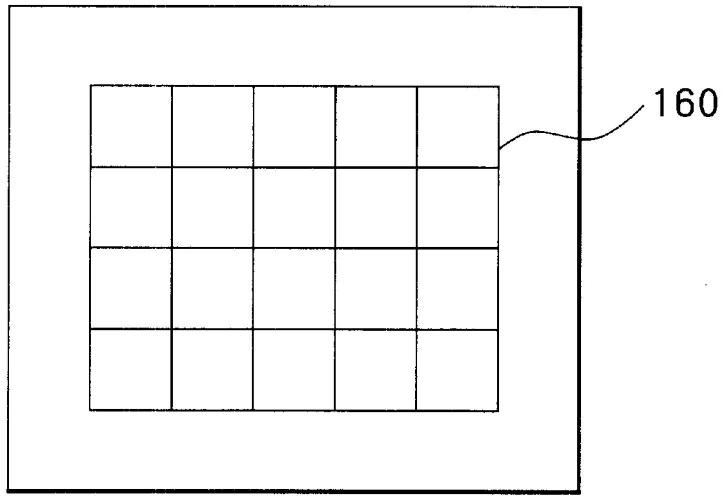
FIGS. 7A–7C are illustrative diagrams for showing how an inputted image is deformed when a correction operation is not performed by using data for correction in the processing circuit shown in FIG. 3.
Figure 7B:
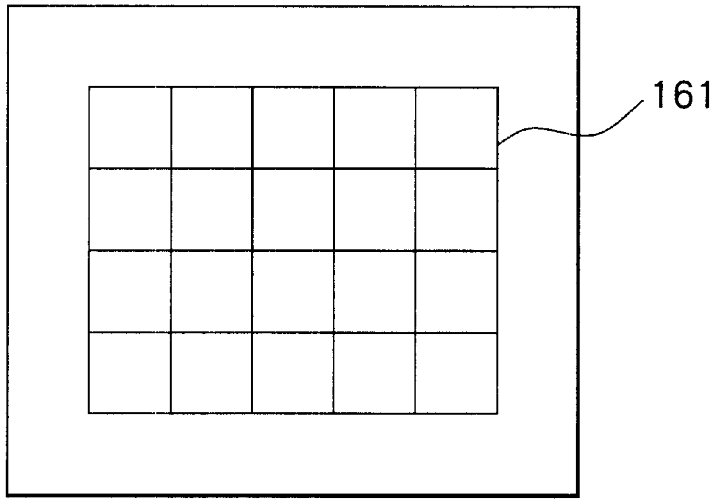
Figure 7C:
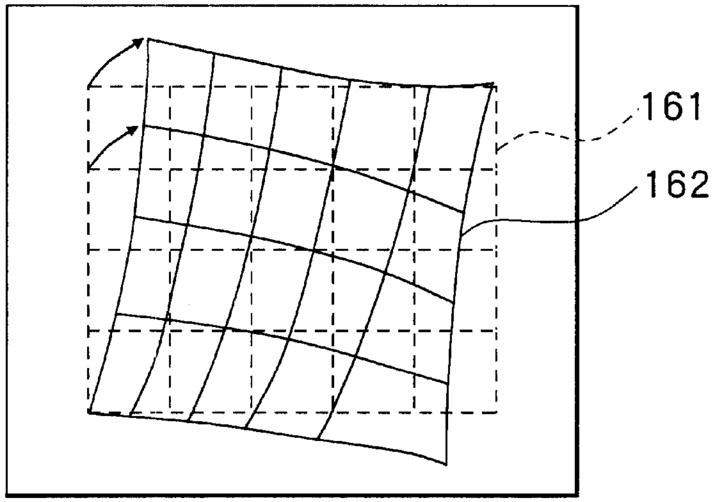
Figure 8A:
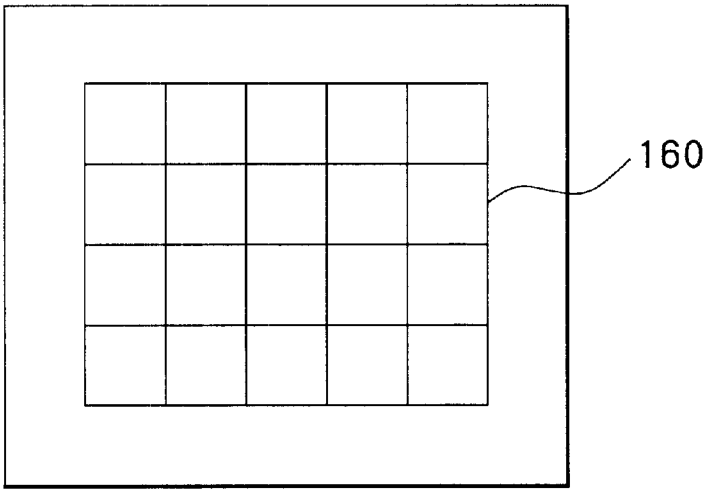
FIGS. 8A–8C are illustrative diagrams for showing how an inputted image is deformed when a correction operation is performed by using data for correction in the processing circuit shown in FIG. 3.
Figure 8B:
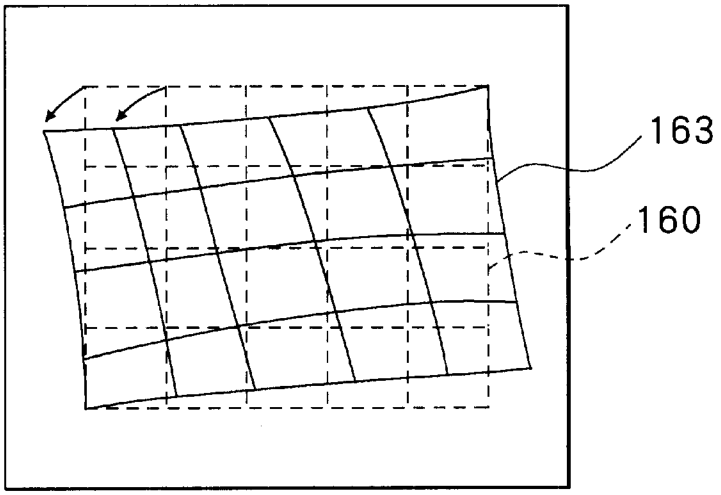
Figure 8C:
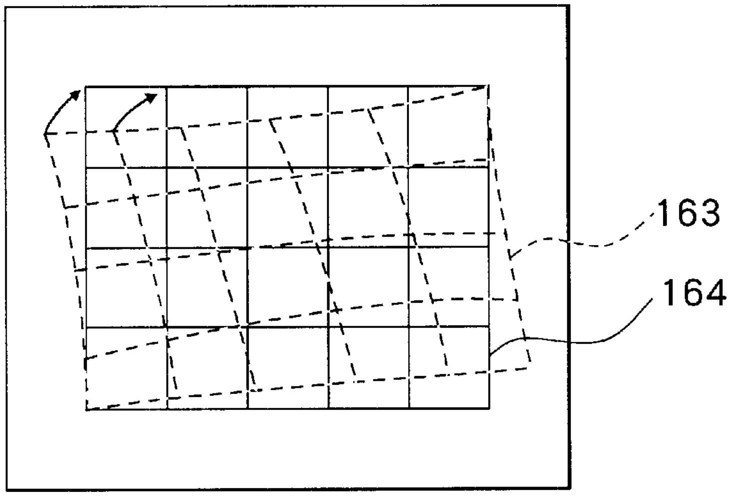

FIGS. 7A and 8A show a left side or a right side divided screen on the frame memory 53. FIGS. 7B and 8B show an image to be outputted from the DSP circuit 55L2 or the DSP circuit 55R2 through the DSP circuit 55L1 or DSP circuit 55R1. FIGS. 7C and 8C show an image of a left side or a right side divided screen to be actually displayed on the phosphor surface 11.

FIGS. 7A–7C show a modified condition of an inputted image where the correction operation by using data for correction has not been performed in the processing circuit shown in FIG. 3. When the correction operation is not performed, an image 160 (FIG. 7A) on the frame memory 53 and an image 161 (FIG. 7B) outputted from the DSP circuit 66L2 or the DSP circuit 55R2 have the same form as that of the inputted image. After that, the image is distorted due to the characteristics owned by the cathode ray tube itself owns, and an image 162 modified as shown in FIG. 7C, for example, is displayed on the phosphor circuit 11. In FIG. 7C, the image shown in broken lines corresponds to an image, to be actually displayed. In the process of displaying an image, a phenomenon where images for each of colors R, G, B are modified in exactly the same manner is called image distortion, and a phenomenon where different modifications for each color occur is called mis-convergence. Here, in order to correct the distortion of the image as shown in FIG. 7C, it is suitable to perform modification in the direction opposed to the characteristic owned by the cathode ray tube in the stage before an image signal is inputted to the cathode ray tube.

FIGS. 8A–8C show a variation of the inputted image, when the correction operation is performed in the processing circuit shown in FIG. 3. The correction operation is performed separately, for each of colors R, G, B. The correction operation uses different data for correction, for the operation for each color, while the operation method is the same for each color. When the correction operation is performed, the image 160 (FIG. 8A) on the frame memory 53 has the same form as that of the inputted image. For the image stored in the frame memory 53 the correction operation is performed by respective DSP circuits 55L1, 55L2, 55R1 and 55R2 where the image is modified based on data for correction in the direction opposed to that in the image modification performed on the inputted image in the cathode ray tube (the modification by the characteristic owned by the cathode ray tube owns, see FIG. 7C). An image 163 after the operation was performed is shown in FIG. 8B. In FIG. 8B, the image shown in broken lines is the image 160 on the frame memory 53 and corresponds to the image before the correction operation is performed. Thus, a signal of the image 163 distorted to the opposed direction to the characteristic owned by the cathode ray tube owns is further distorted by the characteristic owned by the cathode ray tube. As a result, it comes to have the same form as that of the inputted image, and an ideal image 164 (FIG. 8C) is displayed on the phosphor surface 11. In FIG. 8C, the image shown in broken lines corresponds to the image 163 shown in FIG. 8B.

Figure 9:
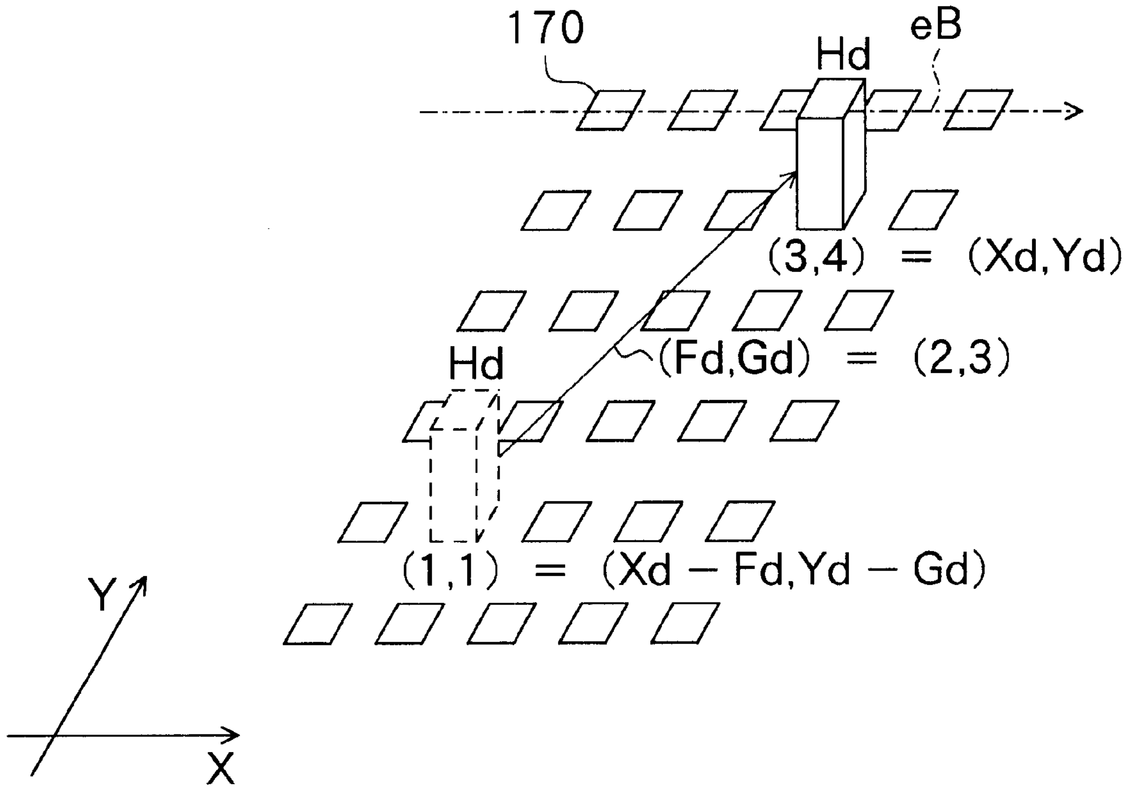
FIG. 9 is an illustrative diagram showing one example of operation processing for correcting a pixel array condition in image data.

Next, the correction operation processing performed in the DSP circuit 55 (DSP circuits 55L1, 55L2, 55R1, 55R2) will be further described in detail. In FIG. 9, pixels 170 are arranged in grid on an integer position in X, Y coordinates. FIG. 9 shows an example of the operation in the case of only one pixel is noted and a condition where an R signal value (called "R value" in the followings), Hd, which is a pixel value of a pixel located at the coordinates (1,1) before the correction operation is performed by the DSP circuit 55, is moving to the coordinates (3,4) after the operation. In FIG. 9, the part shown in broken lines indicates the R value (pixel value) before the correction operation. Here, if the moving amount of the R value is indicated in vectors, (Fd, Gd), (Fd, Gd)=(2,3). Viewing this with regard to the pixel after the operation, it may be interpreted as that it copies the R value Hd at the coordinates (Xd-Fd, Yd-Gd), when the pixel is at the coordinates (Xd, Yd). If such a copy manipulation is performed on all of each pixel after operation was performed, the image to be outputted as the image display is completed. Therefore, it is suitable that the data for correction stored in the data for correction memory 60 is the moving amount (Fd, Gd) corresponding to each pixel after the operation.

The relationship of movement of pixel values described above will be explained with reference to screen scanning in the cathode ray tube, here. Generally, in the cathode ray tube, scanning by the electron beam eB is performed in the direction from the left to the right of the screen (X direction in FIG. 9) horizontally, while scanning is performed in the direction from the top to the bottom of the screen (Y direction in FIG. 9) vertically. Thus, in the case of the pixel arrangement as shown in FIG. 9, when the scanning is performed based on the original video signal, the scanning of the pixel at the coordinates (3,4) would be performed "after" the scanning of the pixel at the coordinates (3,4). However, if the scanning is performed based on the video signal, on which the correction operation processing has been performed by the DSP circuit 55 according to this embodiment, the scanning of the pixel on the coordinates (1,1) in the original video signal will be performed "before" the scanning of the pixel at the coordinates (3,4) in the original video signal. In this embodiment, the two-dimensional arrangement condition of pixels is re-arranged based on the data for correction and the like, and, as a result, the correction processing is performed such that an original one-dimensional video signal is varied in pixel timelikely and spacelikely.

Next, the modulation control of brightness which is a distinctive feature of this embodiment will be described in detail performed in the DSP circuits 50L and 50R and the control portion 62A.

Figure 10A:
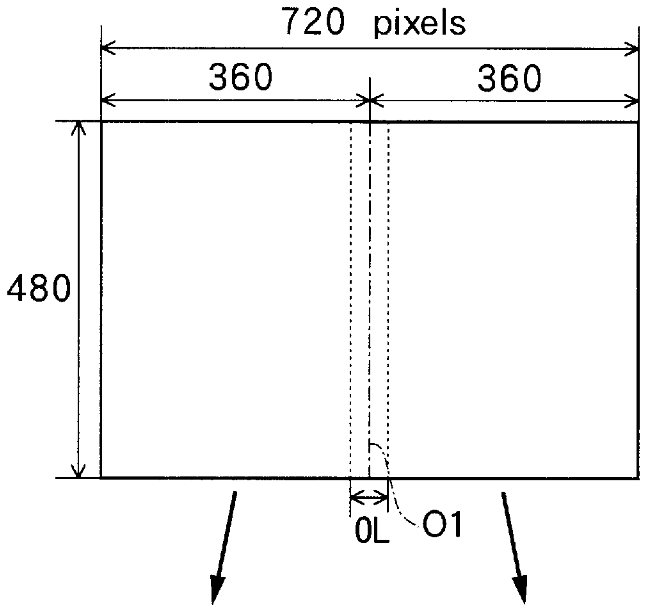
FIGS. 10A–10C are illustrative diagrams for describing signal processing on brightness, which is performed in the processing circuit shown in FIG. 3.
Figure 10B:
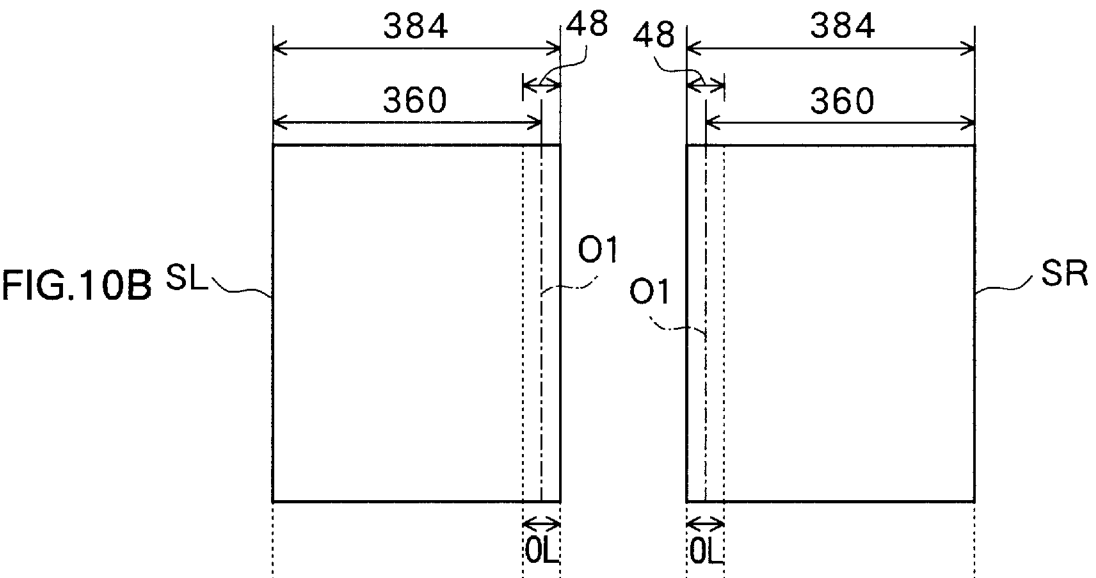

As shown in FIGS. 10A and 10B, it will be explained for the case when a video signal of 720 pixels wide by 480 pixels high, for example, is inputted, and the left and the right divided screens SL, SR are formed such that the areas of 48 pixels wide by 480 pixels high as a center portion of the screen, which are indicated by the input video signal, are overlapped. That is, another description is also shown for the case when video signals for 384 pixels wide by 480 pixels high are inputted to DSP circuits 50L and 50R, respectively, as shown in FIGS. 10A and 10B. In FIGS. 10A and 10B, the code O1 indicates a centerline in the whole screen area.

Figure 10C:
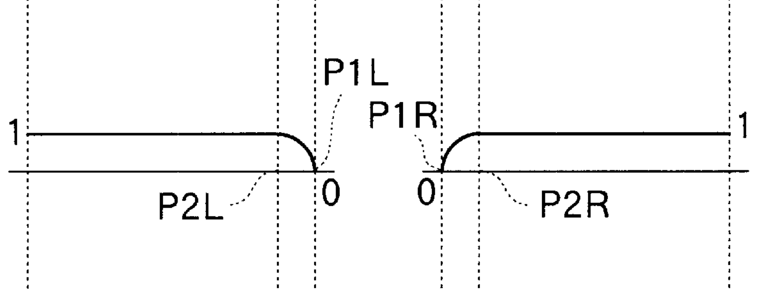

The DSP circuits 50L and 50R and the control portion 62A are capable of performing signal processing on the inputted video signals for controlling the degree of brightness depending on a pixel position in the horizontal direction (the overlapped direction). For example, the DSP circuits 50L and 50R and the control portion 62A, as shown in FIG. 10C, gradually increase the level of brightness from the starting point P1L, P1R of the overlapped region OL, and vary the level of the brightness in a curve to form a brightness gradient for example, so that the level of the brightness reaches maximum at the end points P2L and P2R in the overlapped region OL, and beyond that part, performs the modulation control on the degree of brightness to keep the level of the brightness constant to the end of the screen, in the region other than the overlapped region OL. This modulation control is performed so as to satisfy the equations (4) and (5) described above. If such a control is performed on each of the divided screens SL and SR at the same time to keep the sum of the brightness in both screens in a given pixel position of the overlapped region OL equals to the brightness in the same pixel position of the original image, the joined part of both screens become inconspicuous in brightness. FIG. 10C shows the level of brightness by matching it with the pixel position in each of divided screens shown in FIG. 10B. Also, in FIG. 10C, as an example, the maximum value of the brightness level is 1 and the minimum value of the brightness level is 0.

The brightness gradient in the overlapped region OL may be formed in a sine or cosine function or a quadratic curve. Optimizing the form of the brightness gradient allows the brightness changes in the overlapped region OL to be appeared naturally, and also allows a larger margin for a positional error in overlapping the left and the right divided screens SL and SR.

Further, in this embodiment, the DSP circuits 50L and 50R and the control portion 62A may perform modulation control of brightness based on a signal level in addition to the modulation control of brightness based on the pixel position in the joined direction described above. Next, the modulation control of brightness based on a signal level will be explained.

Figure 24:
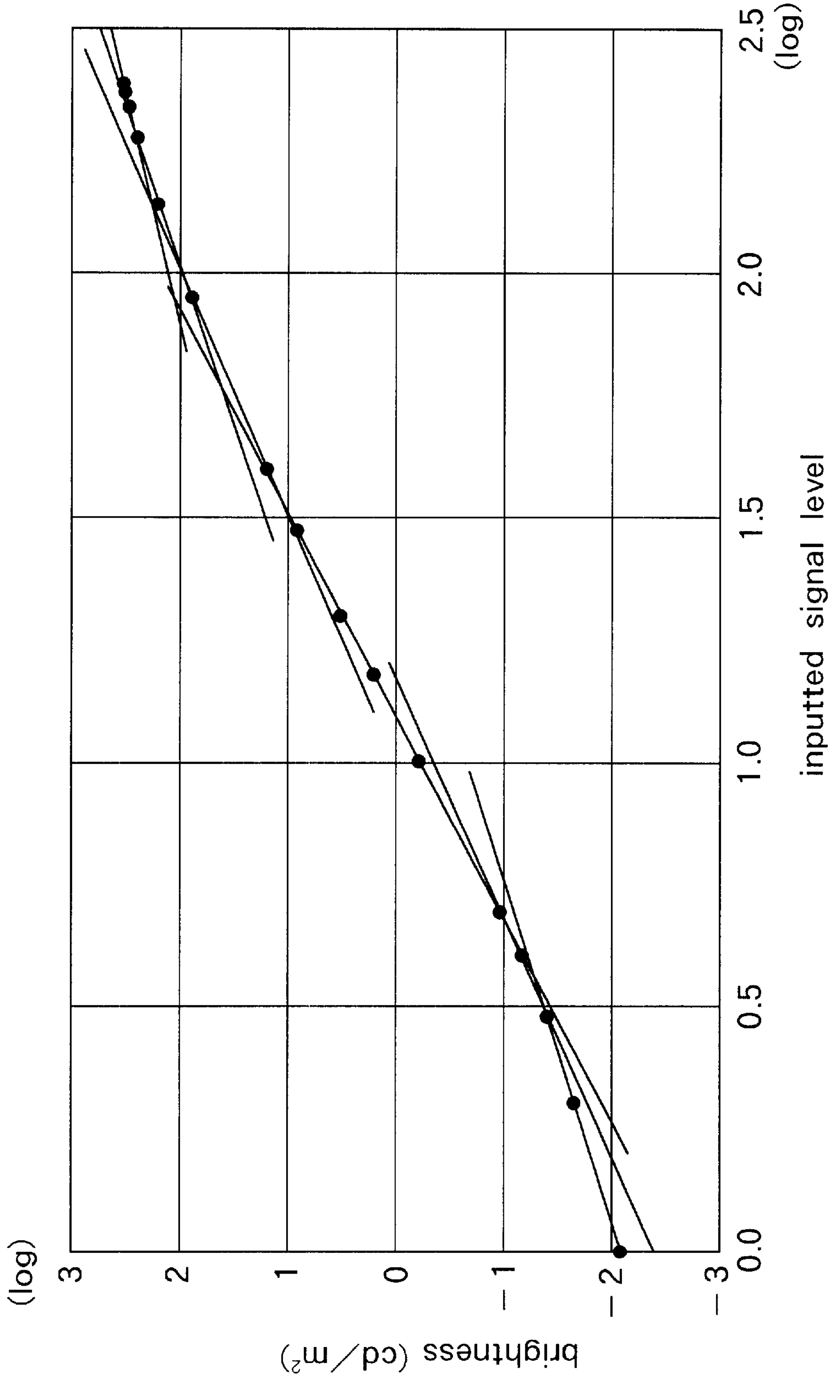
FIG. 24 is a characteristic diagram for describing a gamma value.

Generally, one factor for determining the degree of brightness is a gamma value. The gamma value is different depending on the signal level of an inputted video signal, as described with reference to FIG. 24. Thus, in order to join the left and the right divided screens more accurately so that brightness inconsistencies are not caused, it is desirable to perform the brightness control depending on the signal level of the video signal.

Figure 15:
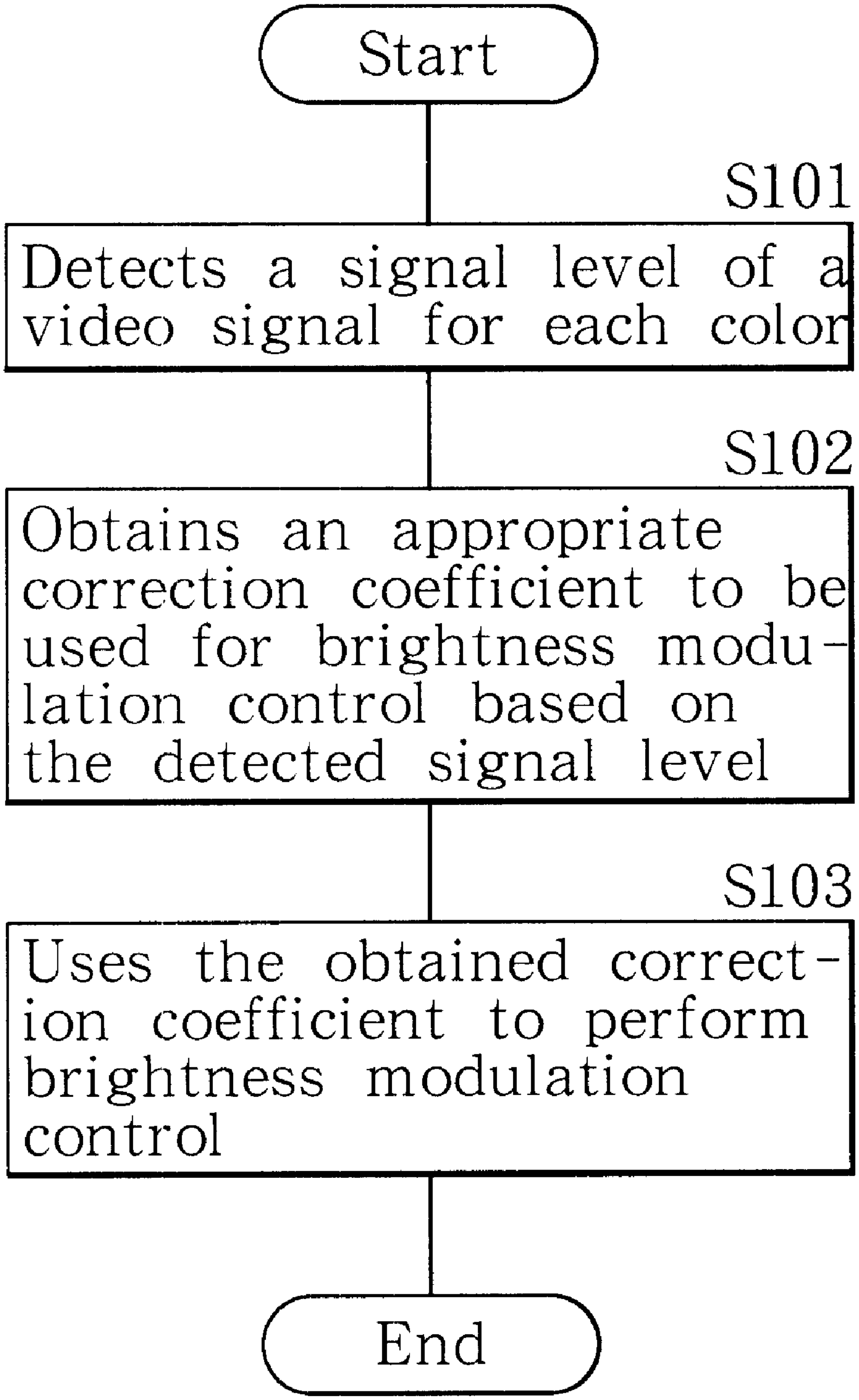
FIG. 15 is a flow chart for describing an overview of brightness control depending on a signal level.

With reference to the flow chart in FIG. 15, a general processing flow of the brightness control depending on the signal level will be described. As shown in FIG. 3, a video signal is inputted from the frame memory 53 to the control portion 62A and the DSP circuits 50L and 50R. The control portion 62A detects the level of a video signal for each color for each unit pixel or unit pixel array (Step S101) during the step where video signals are divided for the left and the right divided screens, that is, video signals for the left and the right divided screens are inputted from the frame memory 53 to the DSP circuits 50L and 50R, for example. Next, the control portion 62A calculates an appropriate correction coefficient for each color, which should be used in the modulation control of brightness, among a plurality of correction coefficients stored in its own memory in advance based on the detected signal level (Step S102). Next, the control portion 62A instructs the DSP circuits 50L and 50R to modulate brightness by using the determined correction coefficient. The DSP circuits 50L and 50R perform the modulation control of brightness on video signals following the instruction by the control portion 62A (Step S103). The DSP circuits 50L and 50R perform the signal processing where the video signals are multiplied by the correction coefficients, for example.

With reference to FIGS. 11 and 12, a specific example of a correction coefficient used for the modulation control of brightness will be explained. FIG. 11 shows specific examples of correction coefficients for the left side divided screen, and FIG. 12 shows specific examples of correction coefficients for the right side divided screens. In this embodiment, as described above, the degree of brightness is controlled such that the brightness gradient is formed in a sine or cosine function in the horizontal direction in the overlapped region OL. The brightness gradient is achieved by multiplying the video signals by correction coefficients k1 and k2 depending on each of pixel positions in the left and the right divided screen, as shown in the equations (2) and (3) described above, in practice. In this embodiment, even if the video signals are of the same pixel position, a different correction coefficient is used depending on the signal level of the video signal.

The specific examples of correction coefficients shown in FIGS. 11 and 12 are actually stored in a memory within the control portion 62A as a table form program. The tables related to correction coefficients shown in FIGS. 11 and 12 may be stored in a memory, which is provided in the outside of the control portion 62A separately for storing a table of correction coefficients. In FIGS. 11 and 12, the cram WRx0 is a correction coefficient group, which is applied to a video signal for an R color at a 0th (or first) row of pixel positions in the horizontal direction in the overlapped region OL, for example. The Cram WGx0 is a correction coefficient group, which is applied to a video signal for a G color at a 0th row of pixel positions in the horizontal direction in the overlapped region OL, for example. The Cram WBx0 is a correction coefficient group, which is applied to a video signal for a B color at a 0th row of pixel positions in the horizontal direction in the overlapped region OL, for example. With regard to pixel positions in the horizontal direction in the overlapped region OL, the point P2L (P1R) shown in FIG. 10 would be a 0th row of pixel positions in the horizontal direction and a position of the point P1L (P2R) would be a 47th (or 48th) row of pixel positions, here, for example. The correction coefficient group is prepared enough for pixel rows in the direction of joining screens in the overlapped region OL. In the example shown in FIG. 10, the overlapped region OL consists of 48 pixels in the horizontal direction (the direction of joining). Thus, in FIGS. 11 and 12, correction coefficients enough for 48 rows are prepared (cram WRx0–cram WRx47 for the R color, for example).

Also, in the examples shown in FIGS. 11 and 12, a group of seven correction coefficients corresponding to a signal level is prepared for each color for each pixel row. In the examples shown in FIGS. 11 and 12, seven values for each color and for each pixel row within "{ }" indicate correction coefficient values, respectively, and have respective coefficient numbers, first, second . . . in order from the left. A coefficient to be actually multiplied by a video signal actually is a value produced by reducing a value shown in FIGS. 11 and 12 by 1/256. That is, in FIGS. 11 and 12, a value of a correction coefficient, 256 is 1 actually.

With reference to FIGS. 13 and 14, a correspondence relationship between a correction coefficient and a signal level of a video signal shown in FIGS. 11 and 12 will be explained. Each value shown in FIGS. 13 and 14 is stored in a program form in a memory within the control portion 62. A memory may be provided separately in the outside of the control portion 62A to store a value.

In a specific example of a method for dividing signal levels shown in FIG. 13, signal levels are divided to 256 division by matching with 256 levels of brightness and classified to seven signal level regions. More specifically, signal levels are classified to seven signal level regions at values 40(var ZI), 80 (var Z2), 120 (var Z3), 160 (var Z4), 200 (var Z5), and 240 (var Z6). A correspondence relationship between correction coefficients and each signal level region shown in FIG. 13 is as shown in FIG. 14, for example. In the example of FIG. 14, the 0-Z1 signal level region is matched with the first correction number in the correction coefficient group shown in FIGS. 11 and 12. Also, in the example shown in FIG. 14, signal levels of Z1-Z2, Z2-Z3, Z3-Z4, Z4-Z5, Z5-Z6, and Z6-255 are matched with 2nd, 3rd, 4th, 5th, 6th, and 7th coefficient numbers, respectively. By following the correspondence relationship shown in FIG. 14, the control portion 62A determines whether a signal level of a video signal is any of signal level regions and selects a correction coefficient corresponding to the determined signal level region. DSP circuits 50L and 50R perform signal processing in order to modulate brightness on a video signal by using the selected correction coefficient.

The values and the like of the correction coefficients shown in FIGS. 11–14 are only one example, the values and the like used in brightness control are not limited to those shown in FIGS. 11–14. For example, in FIGS. 11 and 12, while seven correction coefficients are prepared for each color and for each pixel row, correction coefficients more or less than seven may be used.

As described above, according to this embodiment, a plurality of correction coefficients for each color associated depending on a plurality of signal levels are stored in advance, and among a plurality of correction coefficient, an appropriate correction coefficient to be used for brightness modulation control, is obtained for each color. Then brightness modulation control depending on a signal level is performed on each of a plurality of video signals such that a total sum of brightness at the same pixel position in the overlapped region on a screen, which is scanned based on the plurality of video signals equal to brightness at the same pixel position on an original image. Therefore, brightness control of the left and the right divided screen can be performed properly depending on a signal level of a video signal so that the joined part appears inconspicuous.

According to this embodiment, the brightness modulation control is performed depending on a signal level allowing improvement in brightness inconsistencies in all the shades of gray. Therefore, even when a signal level always varies as of a moving picture, proper brightness control can be performed such that the joined part appears inconspicuous. Further, since the brightness modulation control is performed for each color, it is possible to improve brightness inconsistencies due to a difference in gamma characteristic for each color. Further, since it is possible to change a correction coefficient for each of the left and the right divided screens, it is possible to perform brightness modulation control depending on a characteristic of the left and the right electron guns 31L and 31R. By using those technologies described above, in a cathode ray tube with multiple electron guns, an image quality equal to or better than that with a general single electron gun can be achieved.

[Second Embodiment]

Next, a second embodiment of the present invention will be explained.

In this embodiment, brightness modulation control is performed depending on a pixel position in a direction orthogonal to a direction of joining a plurality of divided screens, instead of brightness modulation control depending on a signal level as in the first embodiment described above.

Figure 17:
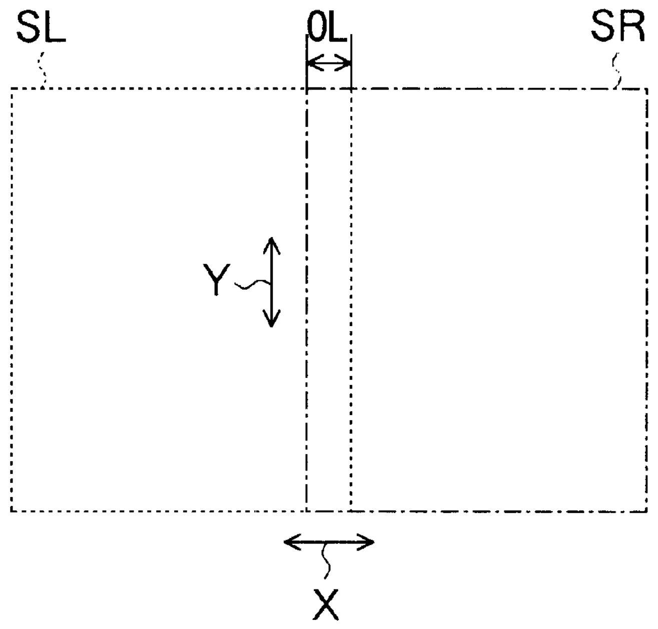
FIG. 17 is an illustrative diagram for describing an overlapped direction in overlapping two divided screens.
Figure 18:
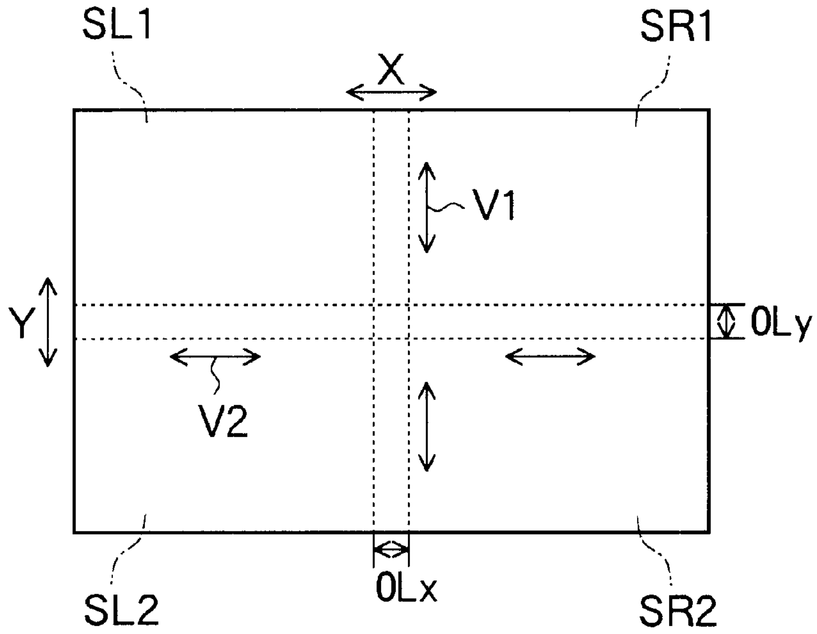
FIG. 18 is an illustrative diagram for describing an overlapped direction in overlapping four divided screens.

First of all, it will be described a relationship between how a plurality of divided screens are joined and "a direction orthogonal to an overlapped direction." For example, when two divided screens SL and SR are overlapped in a horizontal X direction, a vertical Y direction orthogonal to the X direction would be "a direction orthogonal to the overlapped direction", as shown in FIG. 17. Also, for example, when four divided screens SL1, SL2, SR1, SR2 are joined in a top-down direction (Y direction) and a left-right direction (X direction) as shown in FIG. 18, the Y (V1) direction would be "a direction orthogonal to the overlapped direction" with respect to an overlapped region OLx formed by overlapping those four divided screens in the left-right direction. On the other hand, with respect to an overlapped region OLy formed by overlapping those four divided screens in the top-down direction, the X(V2) direction would be "a direction orthogonal to the overlapped direction."

In order to simplify descriptions, it will be described a case where the left and the right divided screens SL and DR are overlapped in the horizontal X direction. The "overlapped direction" is simply called "horizontal direction" and the "direction orthogonal to the overlapped direction" is simply called "vertical direction", below.

Next, brightness modulation control, as a feature part in this embodiment, will be described in detail which is performed in the DSP circuits 50L and 50R and the control portion 62A.

In this embodiment, as in the first embodiment, a case will be described where video signals which is enough for 384 pixels wide by 480 pixels high are inputted to DSP circuits 50L and 50R, respectively, as shown in FIG. 10B. DSP circuits 50L and 50R and the control portion 64A perform signal processing for controlling a degree of brightness depending on a pixel position in the horizontal direction and the vertical direction with respect to inputted video signals. The control portion 62A has a memory, not shown, for storing a plurality of correction coefficients for each color corresponding to a pixel position used in brightness control.

Figure 16:
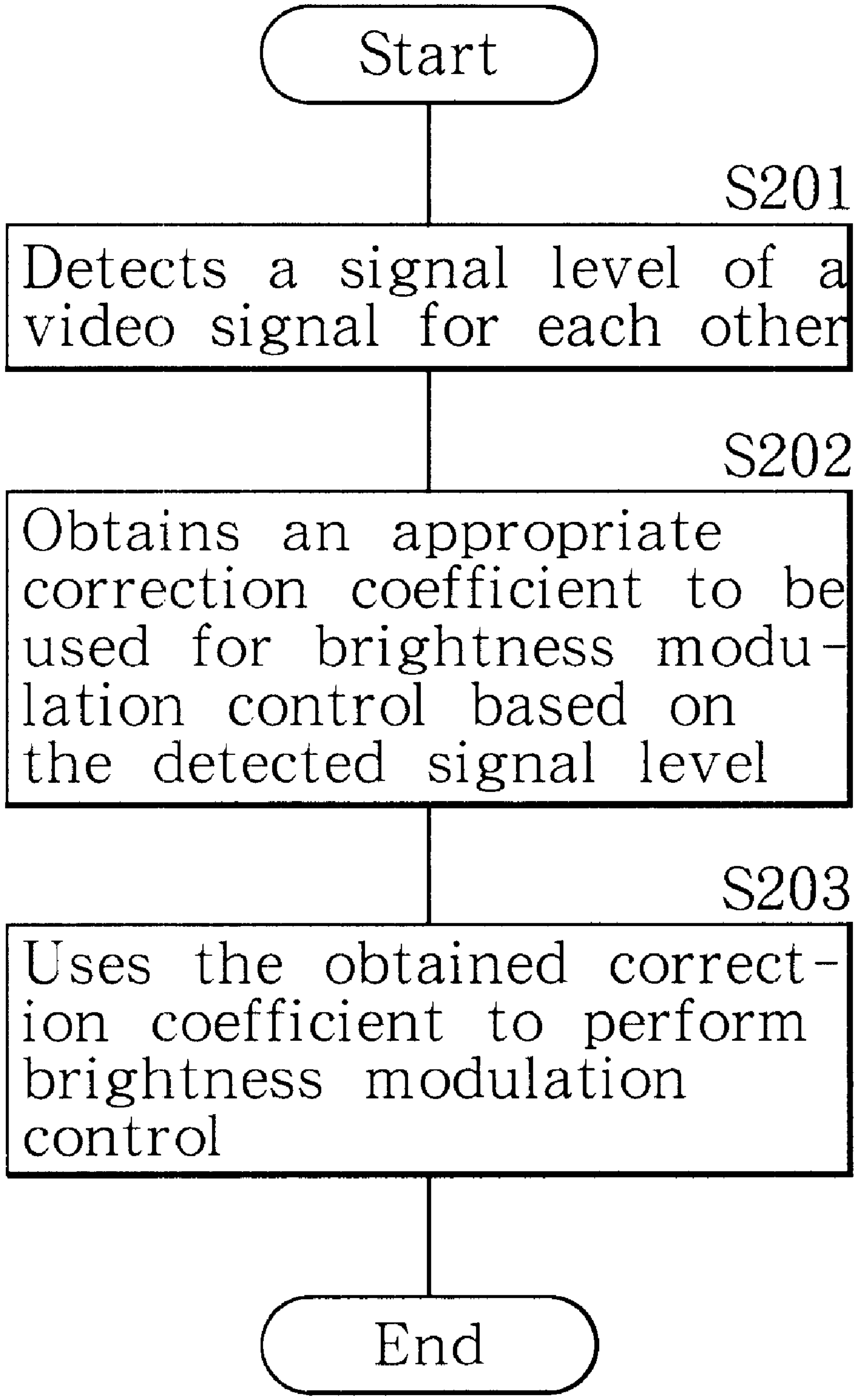
FIG. 16 is a flow chart for describing an overview of brightness control performed in a cathode ray tube according to a second embodiment of the present invention.

With reference to a flow chart shown in FIG. 16, a general flow of the brightness control depending on the pixel position will be described. As shown in FIG. 3, a video signal is inputted from the frame memory 53 to the control portion 62A and the DSP circuits 50L and 50R. The control portion 62A detects a pixel position in horizontal and vertical directions of video signals for each color (Step S201) during the step, for example, where video signals are divided for the left and the right divided screens, that is, video signals for the left and the right divided screens are inputted from the frame memory 53 to the DSP circuits 50L and 50R. Next, the control portion 62A obtains an appropriate correction coefficient for each color to be used in the modulation control of brightness, for every unit pixel among a plurality of correction coefficients stored in its own memory in advance based on the detected pixel position (Step S202). Next, the control portion 62A instructs the DSP circuits 50L and 50R to modulate brightness by using the determined correction coefficient. The DSP circuits 50L and 50R perform the modulation control of brightness on video signals following the instruction by the control portion 62A (Step S203). The DSP circuits 50L and 50R perform the signal processing wherein a video signal is multiplied by correction coefficients, as the modulation control of brightness.

Next, with reference to FIGS. 19 and 20, a specific example of a correction coefficient used for the modulation control of brightness according to this embodiment will be explained. FIG. 19 shows specific examples of correction coefficients for the left side divided screen, and FIG. 20 shows specific examples of correction coefficients for the right side divided screens. In this embodiment, a degree of brightness is controlled such that a brightness gradient is formed in a sine or cosine function in the horizontal direction in the overlapped region OL. Further, in this embodiment, even if the video signals are of the same pixel position in the horizontal direction, a different correction coefficient is used depending on a pixel position in the vertical direction.

The specific examples of correction coefficients shown in FIGS. 19 and 20 are actually stored in a memory within the control portion 62A as a table form program. The tables related to correction coefficients shown in FIGS. 19 and 20 may be stored in a memory, which is provided in the outside of the control portion 62A separately for storing a table of correction coefficients. In FIGS. 19 and 20, the cram WRx0 is a correction coefficient group applied to a video signal for an R color at a 0th (or first) row of pixel positions in the horizontal direction in the overlapped region OL, for example. The cram WGx0 is a correction coefficient group applied to a video signal for a G color at a 0th row of pixel positions in the horizontal direction in the overlapped region OL, for example. Also, the cram WBx0 is a correction coefficient group applied to a video signal for a B color at a 0th row of pixel positions in the horizontal direction in the overlapped region OL, for example. With regard to pixel positions in the horizontal direction in the overlapped region OL, the point P2L (P1R) shown in FIG. 10 would be a 0th row of pixel positions in the horizontal direction and a position of the point P1L (P2R) would be a 47th (or 48th) row of pixel positions, for example. The correction coefficient group is prepared enough for pixel rows in the direction of overlapping screens in the overlapped region OL. In the example shown in FIG. 10, the overlapped region OL consists of 48 pixels in the horizontal direction (the direction of overlapping). Thus, in FIGS. 19 and 20, correction coefficients enough for 48 rows are prepared (cram WRx0–cram WRx47 for the R color, for example).

Also, in the examples shown in FIGS. 19 and 20, eight correction coefficients corresponding to a pixel position in the horizontal direction is prepared for each pixel row. In the examples shown in FIGS. 19 and 20, eight values for each color and for each pixel row within "{ }" indicate correction coefficient values, respectively, and have respective coefficient numbers, first, second . . . in order from the left. A coefficient to be actually multiplied by a video signal is a value produced by reducing a value shown in FIGS. 19 and 20 by 1/256. That is, in FIGS. 19 and 20, a value of a correction coefficient, 256, for example, is actually 1.

Figures 21, 22:
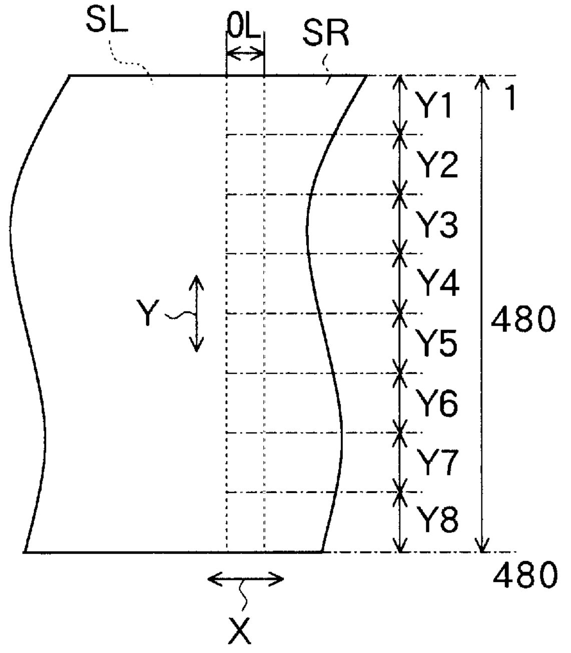
FIG. 21 is an illustrative diagram showing a correspondence relationship between a pixel position in the vertical direction and a correction coefficient.
FIG. 22 is a diagram showing one example of a method for dividing a pixel position in the vertical direction.
Figure 23A:
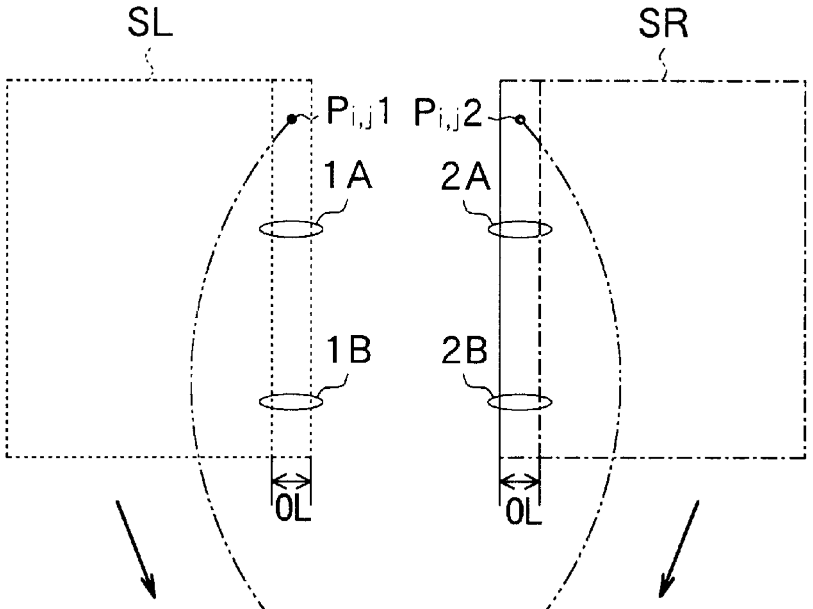
FIGS. 23A–23B are an illustrative diagram for describing differences in brightness in an overlapped region of a screen along with one example of a method for overlapping a plurality of divided screens.
Figure 23B:
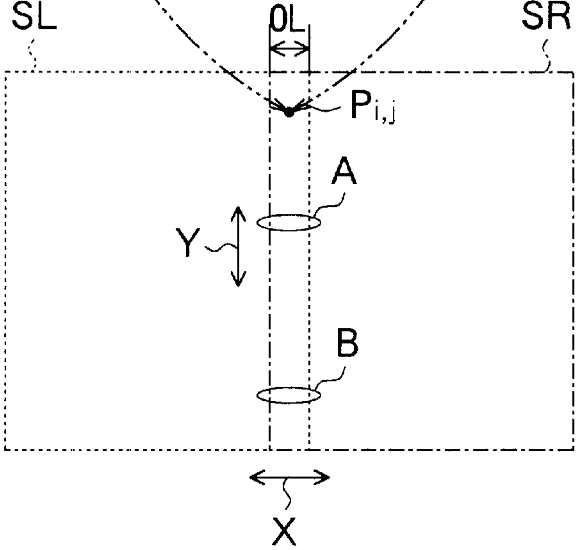

With reference to FIGS. 21 and 22, a correspondence relationship between a correction coefficient and a pixel position in the vertical direction shown in FIGS. 19 and 20 will be explained. A table shown in FIG. 21 is stored in a memory within control portion 62, by the same manner in which a correction coefficient is stored. However, a memory may be provided separately in the outside of the control portion 62A to store a numerical value.

In a specific example of dividing a pixel position shown in FIG. 22, 480 pixels in the vertical direction are equally divided into eight regions including regions Y1–Y8 from the top of the screen. Eight coefficient numbers shown in FIGS. 19 and 20 are associated with region Y1–Y8 equally divided in this manner. That is, 1st, 2nd, 3rd, 4th, 5th, 6th, 7th and 8th coefficient numbers are associated with 1–60(Y1)th, 61–120(Y2)th, 121–180(Y3)th, 181–240(Y4)th, 241–300 (Y5)th, 301–360(Y6)th, 361–420(Y7)th and 421–480(Y8)th pixels, respectively, as shown in FIG. 21, for example. Following the correspondence relationship shown in FIG. 21, the control portion 62A selects a correction coefficient corresponding to a pixel position in the vertical direction. DSP circuits 50L and 50R perform signal processing in order to modulate brightness on a video signal, using the correction coefficient selected in this manner. Thus, brightness modulation control is performed which corresponds to a pixel position in the horizontal and vertical directions.

The numerical values such as the correction coefficients shown in FIGS. 19–21 are only one example, and a numerical value used in brightness control is not limited to those. For example, in FIGS. 19 and 21, while eight correction coefficients are prepared for each color and for each pixel row, correction coefficients more or less than eight may be used.

As described above, according to this embodiment, a plurality of correction coefficients for each color associated depending on a pixel position in the horizontal and the vertical directions are stored in advance, and an appropriate correction coefficient to be used for brightness modulation control is obtained for each color based on a pixel position in the horizontal and vertical directions. Then brightness modulation control depending on a pixel position is performed on each of a plurality of video signals such that a sum of brightness at the same pixel position in the overlapped region on a screen which is scanned based on the plurality of video signals, equals to brightness at the same pixel position on an original image. Therefore, brightness control of the left and the right divided screens can be performed properly on all over the overlapped region OL so that the joined part appears inconspicuous.

Generally, in a cathode ray tube, a spot characteristic of an electron beam differs depending on a pixel position, and especially, there is a significant difference between that in a screen center portion and in a screen end portion. According to this embodiment, it is possible to perform brightness modulation in a vertical direction, brightness inconsistencies due to the spot characteristic can be improved even if there is a significant difference in the spot characteristic between a center potion and a top and a bottom end portions in the overlapped region OL. Also, generally, in a cathode ray tube, a variation is caused in a light-emitting characteristic of a phosphors depending on a position of the phosphor surface 11. According to this embodiment, since the brightness modulation control is performed depending on a pixel position, the brightness inconsistencies due to a light-emitting characteristic can be improved by determining a correction coefficient in view of a light-emitting characteristic of the phosphors. A varied light-emitting characteristic of the phosphors can be obtained by measuring a light-emitting amount of the phosphors when a cathode ray tube is manufactured, for example.

A variety of modifications are possible in the present invention not limited to each of embodiments described above. For example, the brightness modulation control in the first embodiment and the brightness modulation control in the second embodiment may be combined so that brightness modulation control may be performed depending on a signal level, a pixel position in an overlapped direction, and a pixel position in a direction orthogonal to the overlapped direction.

Further, in the embodiments described above, a correction coefficient is changed properly depending on a signal level or a pixel position. However, a correction coefficient may be changed depending on another factor. For example, in a cathode ray tube, a characteristic of a gamma value differs depending on a difference in a characteristic of an electron gun. In view of the difference of the electron gun, the coefficient for correction described above may be determined. Here, the characteristic of the electron gun is a gamma characteristic of the electron gun or a current characteristic or the like of the electron gun. The current characteristic of the electron gun includes a characteristic related to a drive voltage supplied to the electron gun and a value of current flowing inside of the electron gun. Generally, since a difference in the characteristic of the electron gun causes a difference in an electron amount emitted for a drive voltage supplied to the electron gun, it affects a degree of brightness.

Further, the present invention is applicable to the system to form a single screen by combining three or more scanned screens with three or more electron guns. Also, FIG. 1B shows an example where line scanning by each of electron beams eBL and eBR is performed from the center to the end of a screen, in the opposite direction to each other and field scanning is performed from the top to the bottom as in a general cathode ray tube. However, the scanning direction of each of electron beams eBL and eBR is not limited to this, and it is possible to perform line scanning from the end to the center of the screen, for example. In FIG. 2, the field scanning by each of electron beams eBL and eBR is performed from the center to the end of a screen, in the opposite direction to each other. However, it is also possible for the field scanning to be performed from the end to the center of the screen. Further, scanning directions of each of electron beams eBL and eBR may be aligned in the same direction.

In the embodiment described above, the example is described where an analog composite signal in the NTSC system is used as a video signal $D_{IN}$. However, the video signal $D_{IN}$ is not limited to that. For example, an RGB analog signal can be used as the video signal $D_{IN}$. In this case, the RGB signal may be obtained without the composite/RGB converter 51 (FIG. 3). Also, a digital signal used in a digital television may be inputted as the video signal $D_{IN}$. In this case, the digital signal may be obtained directly without passing through the A/D converter 52 (FIG. 3). In both cases where either one of those video signals, a circuit from the frame memory 53 may have the same circuit configuration in the circuit example shown in FIG. 3.

Also, in the circuit shown in FIG. 3, the frame memories 56L and 56R may be omitted from the configuration so that image data outputted from the DSP circuits 55L1 and 55R1 are directly supplied to the electron guns 31L and 31R through the DSP circuits 55L2 and 55R2. Further, in the embodiment described above, the correction in the vertical direction is performed after the correction in the horizontal direction is performed on an inputted image data. However, the correction in the horizontal direction may be conversely performed after the correction in the vertical direction is performed. Furthermore, in the embodiment described above, correction of inputted image data is performed at the same time as enlargement of an image. However, the correction of image data may be performed without involving the enlargement of an image.

The present invention is not limited to a cathode ray tube and applicable to various image display devices, such as a projection type image display device, where an image displayed in a cathode ray tube or the like through a projection optical system is enlarged and projected on a screen.

In addition, in the embodiment described above, the correction processing with regard to brightness and the positional correction processing are performed separately. However, the DSP circuits 50L and 50R for brightness control may be omitted from configuration elements and processing with regard to brightness in DSP circuits 50L and 50R may be performed at the same time as the operation processing for enlarging an image and correcting an image distortion and the like. In the embodiment described above, the correction processing with regard to brightness is performed before the positional correction processing. However, DSP circuits 50L and 50R for brightness control may be located in the rear stage of the DSP circuits 55L2 and 44R2 so that the correction processing with regard to brightness can be performed after the positional correction processing.

In the embodiment described above, the case is described where the positional correction processing is performed by controlling image data directly in order to correct image distortion and the like. However, the processing for correcting the image distortion may be performed by optimizing a deflection magnetic field, which causes a deflection yoke. In this case, as described in the embodiment above, controlling image data directly by using data for correction can reduce image distortion and mis-convergence. Therefore, it is more preferable than a method where an image is adjusted by deflection yoke or the like. In order to eliminate image distortion by deflection yoke or the like, for example, it is necessary to distort the deflection magnetic field. It causes a problem that a uniform magnetic field is no longer achieved, and focus (spot size) of the electron beam is deteriorated thereby. However, in the method for controlling image data directly, it is not necessary to adjust image distortion in the magnetic field of the deflection yoke, and the deflection magnetic field can be a uniform magnetic field, which enhances a focus characteristic.

What is claimed is:

1. A cathode ray tube for performing color image display by forming a single screen by joining a plurality of divided screens being formed by scanning of the plurality of electron beams by partially overlapping each other, comprising:

a signal dividing means for dividing an inputted video signal into a video signal for the plurality of divided screens;

a storage means for storing a plurality of correction coefficient for each color corresponding to a plurality of signal levels;

a signal level detection means for detecting a signal level of an input video signal for each color;

a calculating means for calculating an appropriate correction coefficient for each color to be used for modulation control of brightness among a plurality of correction coefficient stored in the storage means on the basis of the signal level detected by the signal level detection means;

a brightness modulation means for performing control corresponding to a signal level on each of the plurality of video signals for a divided screen so that the sum total of brightness at the same pixel position in an overlapped region on the screen, scanned on the basis of the plurality of video signals for the divided screens, equals to brightness at the same pixel position on an original image by using a correction coefficient for each color calculated through the calculating means; and a plurality of electron guns for emitting a plurality of electron beams, which scans said plurality of divided screens based on a video signal where modulation control has been performed by said brightness modulation means.

2. A cathode ray tube according to claim 1, wherein:

the plurality of correction coefficient stored in the storage means are associated depending on a pixel position in an overlapped direction of a plurality of divided screens in addition to a signal level;

the calculating means calculates an appropriate correction coefficient, to be used for modulation control of brightness, for each color among the plurality of correction coefficients stored in the storage means based on a pixel position in the overlapped direction and a signal level detected by the signal level detecting means; and the brightness modulation means performs modulation control of brightness corresponding to a pixel position in the overlapped direction on each of the plurality of video signals for divided screens by using the correction coefficient calculated by the calculating means.

3. A cathode ray tube according to claim 1, wherein:

the plurality of correction coefficient stored in the storage means are associated depending on a pixel position in an overlapped direction of a plurality of divided screens and a pixel position in a direction orthogonal to the overlapped direction in addition to the signal level;

the calculating means calculates an appropriate correction coefficient to be used for modulation control of brightness, for each color among the plurality of correction coefficients stored in the storage means based on a pixel position in the overlapped direction, a pixel position in a direction orthogonal to the overlapped direction and a signal level detected by the signal level detecting means; and the brightness modulation means performs modulation control of brightness corresponding to a pixel position in the overlapped direction and a pixel position in a direction orthogonal to the overlapped direction on each of the plurality of video signals for divided screens by using the correction coefficient calculated by the calculating means.

4. A cathode ray tube according to claim 1, wherein:

the plurality of correction coefficient stored in the storage means are associated depending on a characteristic of the plurality of electron guns in addition to a signal level;

the calculating means calculates an appropriate correction coefficient to be used for modulation control of brightness, for each color among a plurality of correction coefficients stored in the storage means based on a characteristic of the plurality of electron guns and a signal level detected by the signal level detecting means; and the brightness modulation means performs modulation control of brightness corresponding to a characteristic of the plurality of electron guns on each of the plurality of video signals for divided screens by using the correction coefficient calculated by the calculating means.

5. A cathode ray tube according to claim 1, further comprising:

the positional control means controls an inputted one-dimensional video signal to be converted into a dispersed two-dimensional image data, and varies and corrects a pixel array condition of the two-dimensional image data timelikely and spacelikely, for each of the divided screens and for each color, so that the plurality of divided screens are joined and displayed in an appropriate position, when the image is displayed, after that, the positional control means controls the corrected image data to be converted to one-dimensional video signals again and to be outputted.

6. An apparatus for controlling brightness for performing brightness control of an image displayed in an image display device, which forms a single screen by joining a plurality of divided screens by partially overlapping each other, wherein the apparatus for controlling brightness comprises:

a signal level detection means for detecting a signal level of an inputted video signal for divided screen;

a storage means for storing a plurality of correction coefficient corresponding to a plurality of signal levels;

a calculating means for calculating an appropriate correction coefficient to be used for modulation control of brightness among a plurality of correction coefficient stored in the correction coefficient storage means; and a brightness modulation means for performing control corresponding to a signal level on each of the plurality of video signals for a divided screen so that the sum total of brightness at the same pixel position in an overlapped region on the screen, which is scanned on the basis of the plurality of video signals for the divided screen, equals to brightness at the same pixel position on an original image by using a correction coefficient for each color calculated through the calculating means.

7. An apparatus for controlling brightness according to claim 6 wherein control of brightness depending on a signal level is performed for each color.

8. An apparatus for controlling brightness according to claim 6, wherein:

a plurality of correction coefficients stored in the storage means are associated depending on a pixel position in an overlapped direction of a plurality of divided screens in addition to a signal level;

the calculating means calculates an appropriate correction coefficient to be used for modulation control of brightness, for each color among a plurality of correction coefficients stored in the storage means based on a pixel position in the overlapped direction and a signal level detected by the signal level detecting means; and the brightness modulation means performs modulation control of brightness corresponding to a pixel position in the overlapped direction on each of the plurality of video signals for divided screens by using the correction coefficient calculated by said calculating means.

9. An apparatus for controlling brightness according to claim 6, wherein:

the plurality of correction coefficients stored in the storage means are associated depending on a pixel position in an overlapped direction of a plurality of divided screens and a pixel position in a direction orthogonal to the overlapped direction in addition to the signal level;

the calculating means calculates an appropriate correction coefficient to be used for modulation control of brightness, for each color among the plurality of correction coefficients stored in the storage means based on a pixel position in the overlapped direction, a pixel position in a direction orthogonal to the overlapped direction and a signal level detected by the signal level detecting means; and the brightness modulation means performs modulation control of brightness corresponding to a pixel position in the overlapped direction and a pixel position in a direction orthogonal to the overlapped direction on each of the plurality of video signals for divided screens by using the correction coefficient calculated by the calculating means.

10. An apparatus for controlling brightness according to claim 6, wherein:

the image display device comprises a plurality of electron guns for emitting a plurality of electron beams and is a cathode ray tube, which performs image display by emitting the plurality of electron beams for scanning the plurality of divided screens from the plurality of electron guns based on a video signal after modulation control was performed by the brightness modulation means.

11. An apparatus for controlling brightness according to claim 10, wherein:

the plurality of correction coefficients stored in the storage means are associated depending on a characteristic of the plurality of electron guns in addition to a signal level;

the calculating means calculates an appropriate correction coefficient to be used for modulation control of brightness, for each color among a plurality of correction coefficients stored in the storage means based on a characteristic of the plurality of electron guns and a signal level detected by the signal level detecting means; and the brightness modulation means performs modulation control of brightness corresponding to a characteristic of the plurality of electron guns on each of the plurality of video signals for divided screens by using the correction coefficient obtained by the calculating means.

12. An apparatus for controlling brightness according to claim 6, further comprising:

the positional control means for performing control where an inputted one-dimensional video signal is converted to a dispersed two-dimensional image data and for performing control where a pixel array condition in the two-dimensional image data is corrected by being varied timelikely and spacelikely for each divided screen and the corrected image data is converted to a one-dimensional video signal again for outputting so that the plurality of divided screens are joined and displayed properly in position when image display is performed.

13. A method for controlling brightness for performing brightness control of an image displayed in an image display device, which forms a single screen by joining a plurality of divided screens by partially overlapping each other, wherein the method for controlling brightness comprises steps of:

detecting a signal level of an inputted video signal;

storing a plurality of correction coefficients corresponding to a plurality of signal levels in a storage means;

calculating an appropriate correction coefficient to be used for modulation control of brightness, among a plurality of correction coefficients stored in the storage means; and performing modulation control of brightness corresponding to a signal level on each of the plurality of video signals for a divided screen so that the sum total of brightness at the same pixel position in an overlapped region on the screen, which is scanned based on the plurality of video signals for the divided screens, equals to brightness at the same pixel position on an original image by using the calculated.

* * * * *